United States Patent
Koshiyama et al.

(10) Patent No.: US 8,284,165 B2
(45) Date of Patent: Oct. 9, 2012

(54) INFORMATION DISPLAY APPARATUS WITH PROXIMITY DETECTION PERFORMANCE AND INFORMATION DISPLAY METHOD USING THE SAME

(75) Inventors: Atsushi Koshiyama, Kanagawa (JP); Haruo Oba, Kanagawa (JP)

(73) Assignee: Sony Corporation, Tokyo (JP)

(*) Notice: Subject to any disclaimer, the term of this patent is extended or adjusted under 35 U.S.C. 154(b) by 742 days.

(21) Appl. No.: 11/974,078

(22) Filed: Oct. 11, 2007

(65) Prior Publication Data

US 2008/0122798 A1    May 29, 2008

(30) Foreign Application Priority Data

Oct. 13, 2006   (JP) .................................. 2006-280733

(51) Int. Cl.
*G06F 3/041* (2006.01)
(52) U.S. Cl. .................................... 345/173; 178/18.06
(58) Field of Classification Search .......... 345/173–178; 178/18.06
See application file for complete search history.

(56) References Cited

U.S. PATENT DOCUMENTS

| | | | | |
|---|---|---|---|---|
| 5,305,017 A | * | 4/1994 | Gerpheide | 345/174 |
| 5,543,590 A | * | 8/1996 | Gillespie et al. | 178/18.06 |
| 5,844,506 A | * | 12/1998 | Binstead | 341/34 |
| 5,880,411 A | * | 3/1999 | Gillespie et al. | 178/18.01 |
| 6,222,528 B1 | * | 4/2001 | Gerpheide et al. | 345/173 |
| 6,459,424 B1 | * | 10/2002 | Resman | 345/173 |
| 6,752,317 B2 | * | 6/2004 | Dymetman et al. | 235/462.45 |
| 7,012,567 B2 | * | 3/2006 | Osaka et al. | 342/433 |
| 7,113,175 B2 | * | 9/2006 | Liu et al. | 345/173 |
| 7,786,980 B2 | * | 8/2010 | Lashina | 345/173 |
| 2002/0000977 A1 | * | 1/2002 | Vranish | 345/173 |
| 2002/0060668 A1 | * | 5/2002 | McDermid | 345/173 |
| 2006/0012581 A1 | * | 1/2006 | Haim et al. | 345/173 |
| 2008/0278450 A1 | | 11/2008 | Lashina | |
| 2008/0288895 A1 | * | 11/2008 | Hollemans et al. | 715/863 |
| 2008/0309631 A1 | * | 12/2008 | Westerman et al. | 345/173 |
| 2009/0289914 A1 | * | 11/2009 | Cho | 345/173 |

FOREIGN PATENT DOCUMENTS

| | | |
|---|---|---|
| JP | 7 129308 | 5/1995 |
| JP | 10 39985 | 2/1998 |
| JP | 2002 342033 | 11/2002 |
| JP | 2005 267478 | 9/2005 |
| JP | 2005 275644 | 10/2005 |
| JP | 2006 23904 | 1/2006 |
| JP | 2008 505381 | 2/2008 |
| WO | WO 2006 003590 | 1/2006 |

* cited by examiner

*Primary Examiner* — Jason Mandeville
(74) *Attorney, Agent, or Firm* — Frommer Lawrence & Haug LLP; William S. Frommer; Ellen Marcie Emas

(57) ABSTRACT

An information display apparatus with proximity detection performance contains a display device that displays image information, a sensor constituted of plural detection electrodes, and an adjusting device of detection resolution that adjusts the detection resolution to be detected based on a distance between the sensor and an object that is contacted to any one of the detection electrodes.

11 Claims, 22 Drawing Sheets

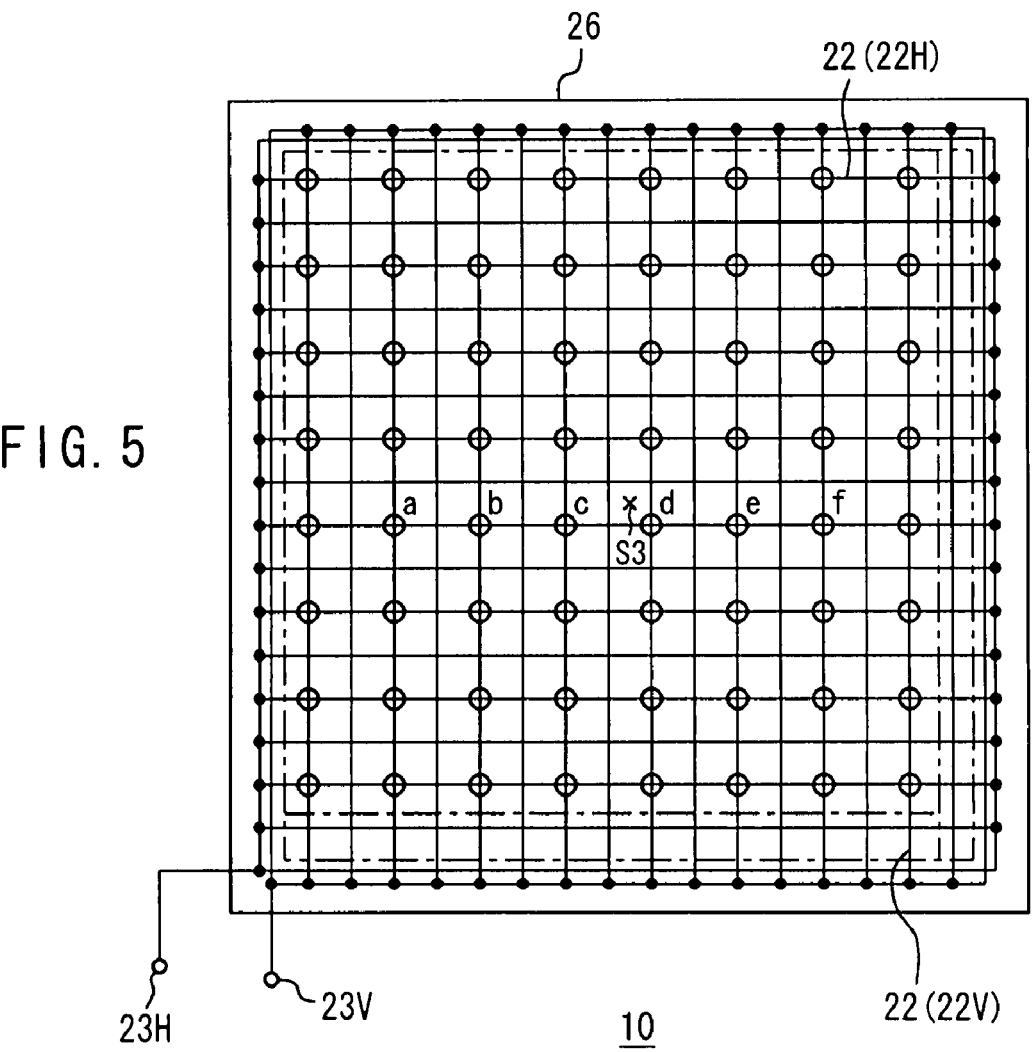

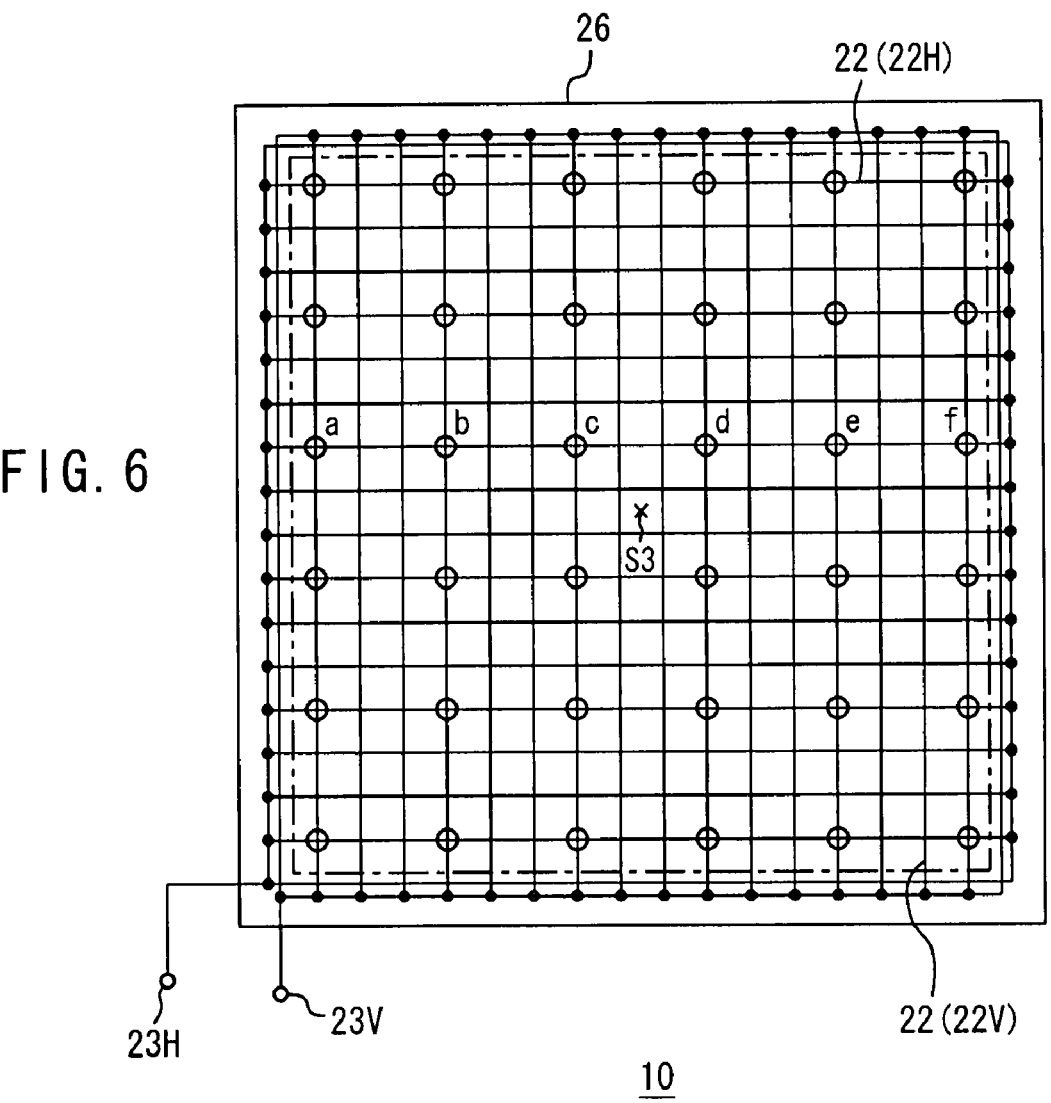

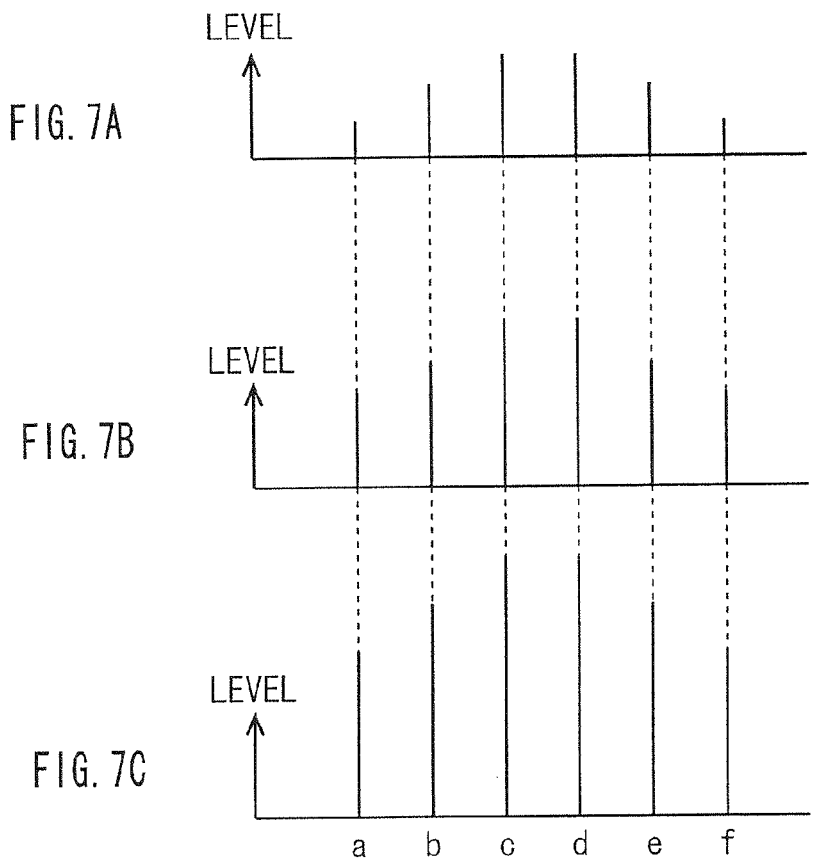

INFORMATION DISPLAY APPARATUS WITH PROXIMITY DETECTION PERFORMANCE AND INFORMATION DISPLAY METHOD USING THE SAME

CROSS-REFERENCES TO RELATED APPLICATIONS

The present invention contains subject matter related to Japanese Patent Applications Nos. JP2006-280733 and JP2007-233361 filed in the Japanese Patent Office on Oct. 13, 2006 and Sep. 7, 2007, the entire contents of which being incorporated herein by reference.

BACKGROUND OF THE INVENTION

1. Field of the Invention

The present invention relates to an information display apparatus and an information display method using the same. More particularly, it relates to an information display panel and the like.

2. Description of Related Art

Japanese Patent Application Publications Nos. 2005-275644 and 2006-23904 disclose plate-like information display apparatuses using liquid crystal display elements or the like. In the information display apparatuses, a transparent touch sensor is mounted on a surface of each of their display panels and by touching the touch sensor with a finger of a user or the like, any contents in a menu displayed on the surface of each of their display panels may be selected and an operation relative to a particular button may be realized.

Japanese Patent Application Publication No. 2005-275644 also discloses such a technology that by only a light touch to the touch sensor, this touch of a user can be detected. Japanese Patent Application Publication No. 2006-23904 also discloses a low-profiled touch panel of capacitance type having a structure with an excellent durability.

SUMMARY OF THE INVENTION

In both of the information display apparatuses disclosed in the Japanese Patent Application Publications Nos. 2005-275644 and 2006-23904, however, the user selects and fixes any displayed information by touching the touch sensor. In this moment, in both of the information display apparatuses, user's finger or the like perfectly touch the touch sensor to select and fix any displayed information. Since the information display apparatuses are not sensitive before the touch sensor has been touched by a finger or the like, no display of the information displayed on the display panel alters at all before the user's finger or the like has touched the touch sensor.

It is desirable to provide an information display apparatus with proximity detection performance and an information display method using the same, by which not only a contact of an object to a surface of the panel sensor can be particularly detected, of course, but a spatial position of the object opposite to the surface of the panel sensor can be also detected.

Accordingly, it is possible to realize a new information display that has not created before if display of the information alters corresponding to a distance between a finger or the like and the touch sensor when the finger or the like gets close the surface of the touch sensor to some extent to select any displayed information by the finger or the like, not touches the touch sensor.

For example, any interactive display can be realized. If the distance between the finger and the touch sensor is set to a first distance (a first detection space), an already displayed image (icons or the like) is automatically get close to a center of the display screen when the finger reaches to this first detection space. When the finger further reaches to a second distance (a second detection space), only an image displayed near a point to which the finger gets close is selectively displayed and magnified. When the finger then contacts the surface of the touch sensor, only an image displayed on a portion of the display screen including the contact point is selected.

In order to realize such the display, it is preferable to detect not only the contact point but also the spatial position of the finger (an object to be detected and allowing selection of displayed information) positioned just above the display panel. In this moment, a detection resolution obtained by taking only the contact point into consideration is insufficient. The detection resolution, as well known, is determined by interval between the electrodes in an array of the touch sensor.

If a position of a finger facing a two-dimensional plane, namely, a spatial position of the finger is detected, it is not necessary to detect as far as a position of the display panel just under the finger (a projection of the finger). It is sufficient to detect a rough position of the two-dimensional plane (a projection thereof) when the position of the finger is projected into the surface of the display panel (two-dimensional plane). Accordingly, the information display apparatus may be so controlled that as it gets away from the projection, the detection resolution is made lowest but as it gets close to the projection, the detection resolution is made highest.

According to an embodiment of the present invention, there is provided an information display apparatus with proximity detection performance. The information display apparatus contains a display device that displays image information, a sensor constituted of plural detection electrodes, and an adjusting device of detection resolution that adjusts the detection resolution to be detected based on a distance between the sensor and an object to be contacted to any one of the detection electrodes.

As the display device, a two-dimensional display device such as LCD and a transparent organic electroluminescence (EL) is used. The sensor of two-dimensional plane such as a panel sensor is provided in connection with the display device.

The sensor is constituted of plural detection electrodes. The plural detection electrodes are arranged on the two-dimensional plane. How to arrange them is optional. In general, they are arranged in matrix to allow them to detect the object uniformly.

The sensor may be integral with the display device with the sensor being adhered to a surface of the display device. The sensor may be separated from the display device so that they can be used with them being isolated from each other. Either of such the configurations is selected in response to a use of the information display apparatus.

The sensor contains a panel sensor of capacitance detection type that specifies a position in the two-dimensional plane based on any difference in capacitance. It is possible to detect not only a contact point of a user's finger to a surface of the two dimensional plane, but also a position (a spatial position) of the finger opposite to the two dimensional plane. Detection resolution for the finger as the object to be detected is variable. The detection resolution is determined by a detection interval by the electrodes constituting the sensor.

An adjusting device of detection resolution adjusts the detection resolution by thinning out number of the electrodes that contribute to the detection electrodes (expanding the detection interval by the detection electrodes) electrically based on a finger's spatial position. The detection resolution is specifically made loose when finger's spatial position is away from the two-dimensional plane. Adjusting the detection resolution in response to an approach of the finger to the two-dimensional plane enables to be detected the finger's spatial position in a space from a position away from the two-dimensional plane in some extent to the contact point of the two-dimensional plane that the finger actually contacts.

The detectable space (the space between the sensor and the finger) varies based on the detection interval by the detection electrodes. The larger the detection interval by the electrodes that actually contribute to the detection electrodes is increased, the larger the detection space may be secured. This detection interval by the electrodes varies in response to a use of the information display apparatus. If the detection interval by the electrodes is narrowed, the detection space becomes about 5 through 10 cm while if the detection interval by the electrodes is increased, the detection space can be formed to about one meter.

As the detection electrodes, transparent wired electrodes, point electrodes or the like are used. In any of the following embodiments, the detection electrodes are arranged in matrix and used. Each of the point electrodes is constituted of a coil and a capacitor, which are connected to each other in parallel, and an oscillator that is arranged near the coil and the capacitor.

The adjusting device of detection resolution adjusts the detection resolution by detecting variation in the capacitance between the sensor and an object (a fingertip or the like) to be detected. In specific terms, the variation in the capacitance is converted into a variation in frequency and the variation in frequency is changed to voltage so that the detection resolution can be adjusted based on a magnitude of a detected voltage.

It is preferable that a detection sensitivity of any detection electrodes is adjusted in connection with adjustment of the detection resolution. For example, the detection sensitivity is adjusted as to be desensitized in accordance with shortening a distance (opposed distance) between the two-dimensional plane and the fingertip. This is because it is difficult to detect the spatial position of the fingertip set as being within a sensitive range if setting the detection sensitivity to be increased to some extent and it is difficult to detect any near spatial position or a contact point itself by oscillation if desensitizing the detection sensitivity in accordance with shortening the distance between the two-dimensional plane and the fingertip.

The spatial position may be detected successively or gradually. In a case where the spatial position is gradually detected, for example, the distance between the two-dimensional plane and the fingertip including the contact point is classified into three stages (first through third detection spaces) and in each space, any adjustment and/or display control vary.

If detecting a position of the fingertip over the two-dimensional plane, a display of the information (image) displayed on the two-dimensional display device is controlled based on a motion of the fingertip. Thus, detecting a position of the fingertip in any detection spaces, and a motion and a locus of the fingertip enables an information display apparatus with proximity detection performance and the like to be provided, by which a display of information displayed on the two-dimensional display device may be controlled.

According to another embodiment of the present invention, there is provided an information display apparatus with proximity detection performance. This information display apparatus contains a display device that displays image information, a sensor constituted of a detection electrode, the sensor being provided on a surface of the display device, and an adjusting device of detection resolution that adjusts the detection resolution to be detected based on a distance between the sensor and an object that is connected to any one of the detection electrodes. The image information displayed on the display device is controlled in its size, motion, and rotation direction based on any one of a movement of the object and the distance between the sensor and the object.

According to further embodiment of the present invention, there is provided an information display apparatus with proximity detection performance. This information display apparatus contains a display device that displays image information, a sensor of capacitance type that is constituted of plural detection electrodes, the sensor being provided on a surface of the display device, a control device that controls output of each of the detection electrodes, and an administration device that administrates activation or non-activation of each of the detection electrodes. If the sensor of capacitance type detects no object, the control device controls the output of each of the detection electrodes to increase the output to their maximum and the administration device performs processing to make detection interval by the detection electrodes maximum. If the sensor of capacitance type detects the object, the control device controls the output of each of the detection electrodes to decrease the output based on the distance between the detected object and each of the detection electrodes and the administration device performs processing to make detection interval by the detection electrodes narrower.

According to additional embodiment of the present invention, there is provided an information display method of displaying information. This method contains the steps of detecting a distance between a sensor and an object by a sensor relative to a display device, adjusting detection resolution of the sensor based on the distance between the sensor and the object, and controlling display state of the image information displayed on the display device in its size, motion, and rotation direction based on a motion of the object and the distance between the sensor and the object.

According to the above-mentioned embodiments of the invention, it is possible to detect not only a contact of the object to a set surface of the sensor that is arranged in panel particularly, of course, but also a spatial position of the object opposite to the set surface of the sensor. It is also possible to control the display state with the detection resolution being adjusted in response to the spatial position of the object.

Accordingly, adjusting the detection resolution in response to the spatial position of the object enables a motion of the object to be surely detected. Detecting the motion of the object enables the display of the information to be controlled in response to the motion of the object within a space up to the contact to the sensor, thereby realizing a new interactive display of the information.

The concluding portion of this specification particularly points out and directly claims the subject matter of the present invention. However those skills in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 5 is a diagram for illustrating a detection resolution (No. 2);

FIG. 6 is a diagram for illustrating a detection resolution (No. 3);

FIGS. 7A, 7B, and 7C are diagrams each for showing a relationship between a detection space and a detection level of the object;

FIG. 8 is a table for showing a relationship of detection spaces, detection levels, detection sensitivities, and detection resolutions;

DESCRIPTION OF THE PREFERRED EMBODIMENTS

The following will describe the preferred embodiments of an information display apparatus with proximity detection performance and an information display method using the same according to the invention into details with reference to the accompanying drawings.

As an embodiment, the information display apparatus with integral configuration in which a panel sensor is adhered to a surface of the display device will be described. In this information display apparatus, as the detection electrodes of the sensor, the transparent wired electrodes and the point electrodes are respectively used.

As another embodiment, the information display apparatus with separate configuration in which a sensor is separated from the display device will be described. In this information display apparatus, as the two-dimensional display element used in the display device, a transparent organic EL through which a back side thereof can be seen when the display apparatus is not activated is illustratively used. As the detection electrodes of the sensor, the point electrodes are illustratively used.

Figure 1:
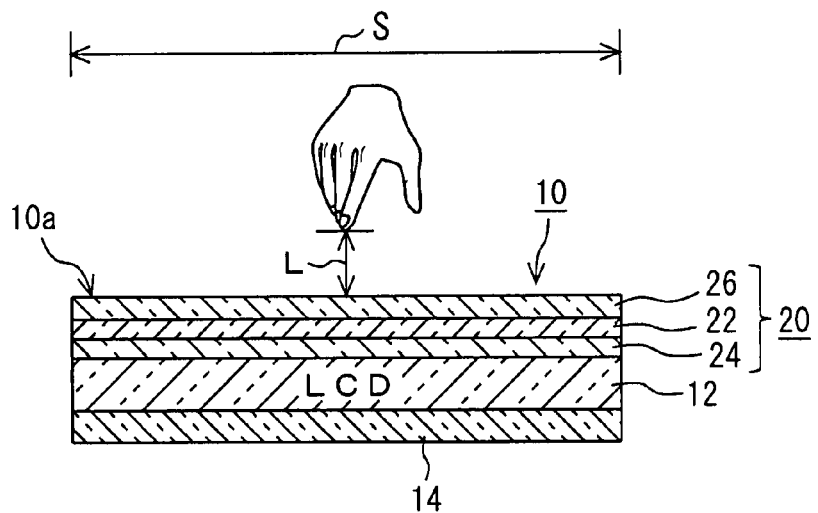
FIG. 1 is a sectional view of an example of a display panel, which is used in an embodiment of an information display apparatus with proximity detection performance according to the invention, for showing an important portion thereof.
Figure 2:
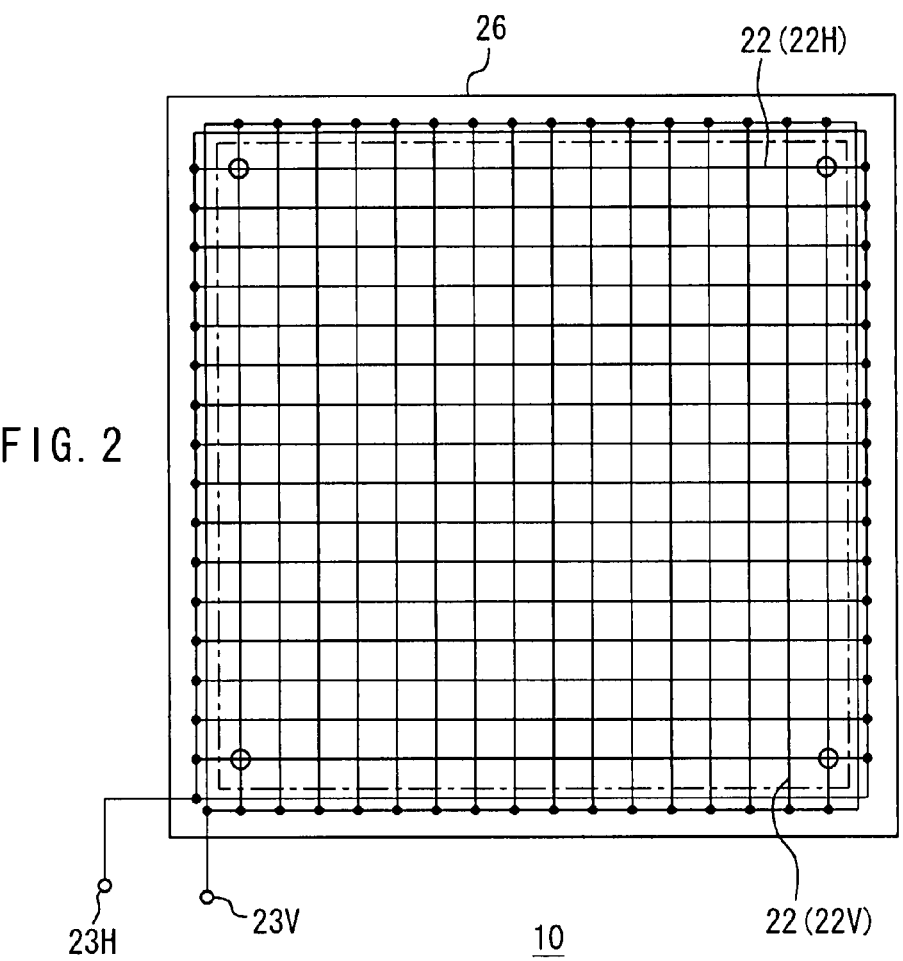
FIG. 2 is a plan view of the display panel shown in FIG. 1.

The following will first describe an information display apparatus to which the invention is applicable. FIG. 1 shows an important portion of a display panel 10 that is a main body of an information display apparatus 1 with proximity detection performance according to an embodiment of the invention. FIG. 2 shows a plan view thereof.

The display panel 10 has two-dimensional display element 12. As the two-dimensional display element 12, liquid crystal display (LCD) element, organic electroluminescence (EL) element, plasma display element or the like is used. A display size of the display panel 10 is determined according to its type such as portable type or stationary type. In this embodiment, LCD having a size of 15 through 20 inches is used.

A protection board 14 is adhered to a back side of the two-dimensional display element 12. A sensor 20 is provided on a front side of the two-dimensional display element 12. The sensor 20 acts as a two-dimensional touch sensor (panel sensor). The sensor 20 has such a configuration that any transparent two-dimensional electrodes 22 as the detection electrodes are sandwiched between two thin transparent plate glasses 24, 26 as dielectrics.

The two-dimensional electrodes 22 may be constituted of wired electrodes (transparent electrodes) or a transparent electric conductive layer. In this embodiment, the two-dimensional electrodes 22 are constituted of wired electrodes. The two-dimensional electrodes 22 has a plurality of horizontal electrodes (detection electrodes for horizontal axis) 22H as wired electrodes that are arranged horizontally with a predetermined distance therebetween and a plurality of vertical electrodes (detection electrodes for vertical axis) 22V as wired electrodes that are arranged vertically with a same distance therebetween as that of the horizontal electrodes 22H, as shown in FIG. 2. Thus, the two-dimensional electrodes 22 have such a configuration that the horizontal and vertical electrodes 22H, 22V can be arranged in matrix with them intersecting.

A common terminal 23H for the plural horizontal electrodes 22H and a common terminal 23V for the plural vertical electrodes 22V are respectively derived from respective ends of the plate glass 26. Any high-frequency signal for detecting a position is applied to these common terminals 23H, 23V alternately, which will be described later.

The display panel 10, which is constituted of the two-dimensional display element 12 and the sensor 20, acts as information display device and a touch sensor of capacitance type. When an information signal (image signal) is supplied to the two-dimensional display element 12, the two-dimensional display element 12 displays this information. When a user touches the sensor 20, he or she can perform a selection and/or a display of any corresponding information.

Because of the display panel 10 of capacitance type, the display panel 10 acts as a sensor with proximity detection performance. In other words, by contacting a fingertip or the like to a surface 10a of the display panel 10, it is possible to specify coordinates of a contact point S3 based on values of pieces of capacitance (actually, variation of frequency) of the horizontal and vertical electrodes 22H, 22V at the contact point S3.

Figure 3:
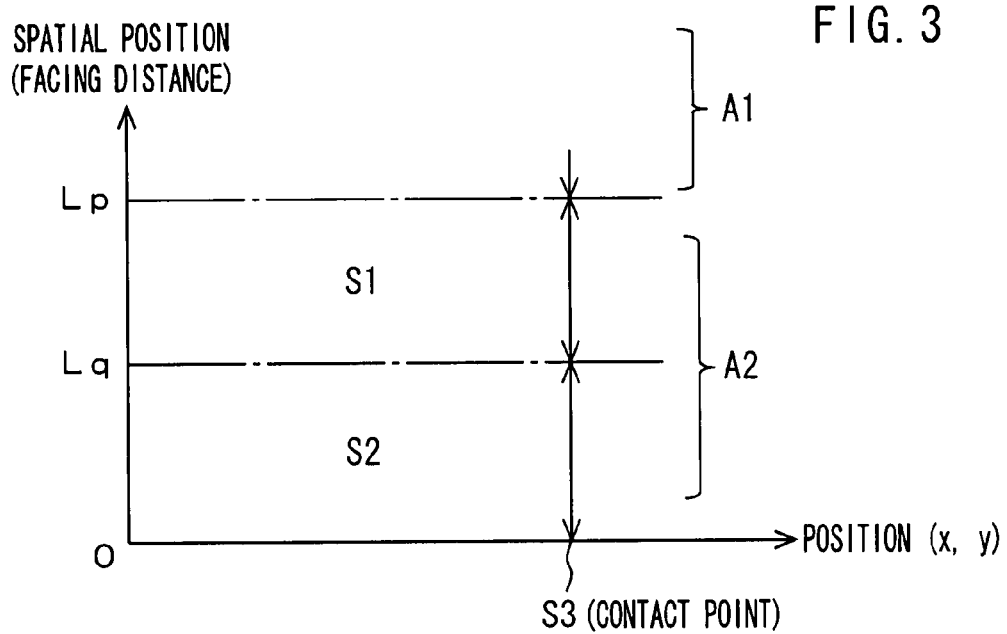
FIG. 3 is an explanatory diagram for showing an object in a detection space.

In addition thereto, according to the embodiment of this invention, when the fingertip (any specific member, any mobile member may be approval) as an object faces the display panel 10 in a space S upon a two-dimensional plane of the surface 10a of the display panel 10, a distance L of the fingertip from the surface 10a of the display panel 10 generates a detection space for detecting the fingertip. As shown in FIG. 3, when the fingertip stays away from the surface 10a of the display panel 10 exceeding a distance Lp, a dead area (non-detection area) A1 is generated while when the fingertip stays away from the surface 10a of the display panel 10 not exceeding the distance Lp, a sensitive area (detection area) A2 in which a position of the fingertip can be sensed is generated. It is determined by detecting the fingertip facing the surface 10a of the display panel 10 as a variation of capacitance whether is the detection area A2 or the non-detection area A1. The higher the detection sensitivity on the capacitance is increased, the longer the distance Lp can be set.

The detection area varies based on a detection interval by the detection electrodes. The larger the detection interval by the electrodes that actually contribute to the detection electrodes is increased, the longer the detection area may be detected. This detection interval by the electrodes varies in response to a use of the information display apparatus. If the detection interval by the electrodes is narrow, the detection area A2 becomes about 5 through 10 cm while if the detection interval by the electrodes is increased, the detection area A2 can be formed to about one meter. If it is supposed that the invention is applied to a compact portable display device, as the above example, such the distance Lp is designed so that the detection area A2 can become about 5 through 10 cm.

It is preferred that a spatial position of the fingertip can be successively measured in an area up to the contact point S3 where the finger contacts the surface 10a of the display panel 10. In this embodiment, for the convenience, the detection area is classified into some detection spaces S1, S2, and S3 based on the distance L. The first detection space S1 indicates a space from the distance Lq to the distance Lp. If Lp=10 cm, the distance Lq is selected as to become about 5 cm.

The second detection space S2 indicates a space from the vicinity of zero to the distance Lq. In this embodiment, the third detection space (detection point) indicates a contact point S3 to the surface 10a of the display panel 10.

A spatial position to be detected is determined by a detection resolution (a detection resolution for position). The detection resolution is generally determined by a detection interval by the detection electrodes. The shorter the detection interval by the detection electrodes is made, the higher the detection resolution is increased. Such the detection resolution has been fixed.

According to the embodiment of the invention, the spatial position to be detected stays in an area over the surface 10a of the display panel 10 including the surface 10a of the display panel 10. If the fingertip stays at a position in the space, capacitance on the two-dimensional plane varies in the space. It, however, is less necessary to project the spatial position thereof into the two-dimensional plane in the surface 10a of the display panel 10 accurately and to detect such the projected point as a detection point. This is because there are many cases where it is sufficient that some regions including the projected point can be detected.

Thus, it is not necessary that the detection resolution is so set as to become very higher. Actually, it is preferred that the detection resolution is set as to be at least the interval between the detection electrodes or less, in order to detect the contact point S3 in the surface 10a of the display panel 10.

By taking this into consideration, it is preferred to select the detection resolution according to the spatial positions. The detection resolution is not continuously controlled so that it can be switched to the detection resolutions corresponding to the spatial positions as shown in FIG. 3. In other words, the detection resolution may be adjusted by stages.

In a case as shown in FIG. 3, the detection resolutions are switched by three stages based on the detection spaces S1, S2, and S3. The detection resolutions can be switched by thinning out the horizontal and vertical electrodes 22H, 22V constituting the sensor 20.

In order to make the detection resolution highest, an interval of adjacent detection electrodes can be detected. In this moment, the minimum detection region is a detection interval by the detection electrodes so that the sensor 20 is thick with coordinate points to be detected, which are shown by circles in FIG. 4. This is referred to as "the highest detection resolution".

Figure 4:
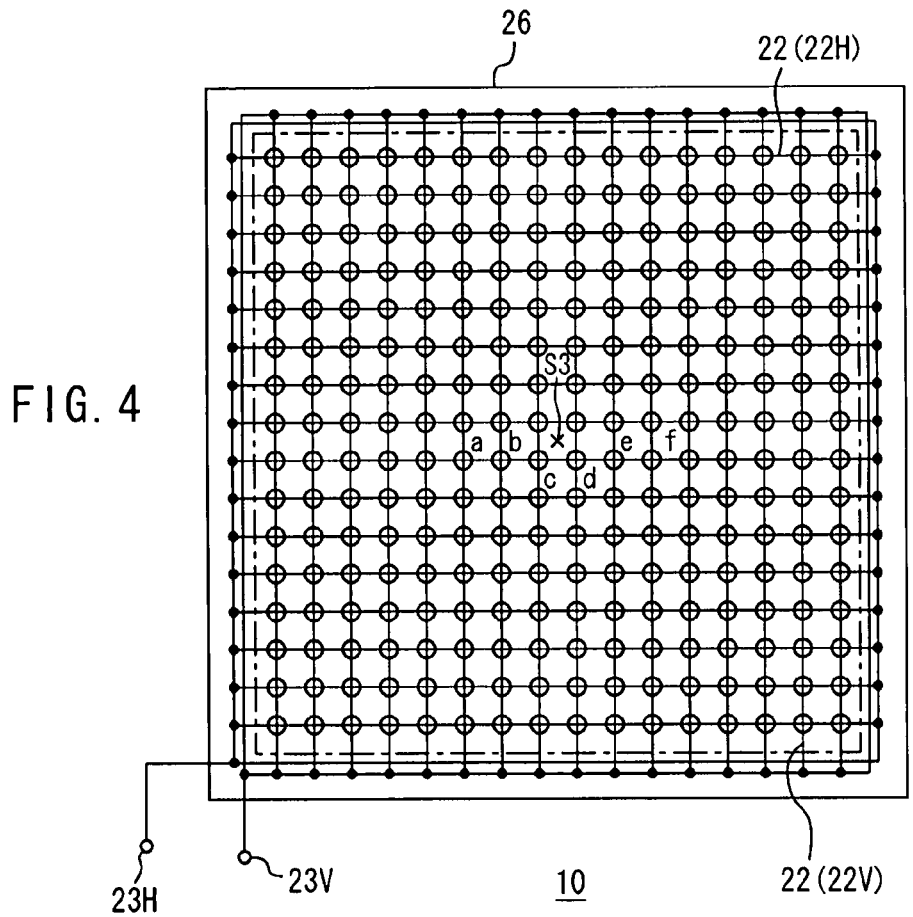
FIG. 4 is a diagram for illustrating a detection resolution (No. 1)

In order to make the detection resolution lower, some electrodes are electrically thinned out of the sensor 20 shown in FIG. 4. For example, as shown in FIG. 5, the sensor 20 is configured so that the horizontal and vertical electrodes 22H, 22V are respectively thinned out every other electrode. In this moment, the minimum detection region is expanded four times, so the detection resolution is deteriorated. This is referred to as "the middle detection resolution". It is possible to realize that number of the detection electrodes, which contribute to the detection electrodes, is thinned out by any electric processing.

If many detection electrodes are thinned out and the sensor 20 is configured so that the horizontal and vertical electrodes 22H, 22V are respectively formed every third electrode, as shown in FIG. 6, the minimum detection region is further expanded than that shown in FIG. 5. This enables the detection resolution to become lowest, which is referred to as "the lowest detection resolution".

Accordingly, when an object (fingertip) gradually approaches toward the surface 10a of the display panel 10, it is possible to narrow the detection region gradually by switching the detection resolution successively from the lowest one to the highest one gradually based on the distance between the sensor and the object.

An adjusting device of detection resolution adjusts the detection resolution by detecting a variation in capacitance between the sensor 20 and the object. Particularly, the variation in the capacitance is converted to a variation in the frequency and this variation in the frequency is changed to voltage, so that the detection resolution can be adjusted based on magnitude of the voltage, which will be described later.

The detection resolution is highest when the fingertip or the like contacts a surface 10a of the display panel 10, namely, a surface of the plate glass 26, at a position shown as x point in FIG. 4 (in the third detection space S3) so that the highest output voltage is obtained from the contact point S3. Output voltages of a total of six detection electrodes such as horizontal electrodes "a" through "f" that are positioned horizontally with the contact point S3 being set as their middle, as shown in FIG. 4, have such an output property that the contact point S3 has a highest level and the electrodes "a" through "f" have levels with these electrodes having gradually decreased levels depending on their interval from the contact point S3 as shown in FIG. 7C. Thus, detecting such the magnitude of levels enables the contact point S3 to be specified.

In the second detection space S2, the sensor 20 has a configuration to have the detection interval by the detection electrodes as shown in FIG. 5. Since the fingertip does not contact the surface 10a of the display panel 10, levels of the output voltages obtained from the horizontal electrodes "a" through "f", which are near a point just below the fingertip (a projection point of the fingertip to the surface 10a of the display panel 10), are decreased to some extent (see FIG. 7B). Even if the levels are decreased, the maximum voltage value thereof is output from any horizontal electrodes near the projection point of the fingertip, so that a region including the projection point can be detected based on difference between the levels.

In the first detection space S1, the sensor 20 has a configuration to have the detection interval of the detection electrodes as shown in FIG. 6. Levels of the output voltages obtained from the horizontal electrodes "a" through "f", which are near the projection point of the fingertip to the surface 10a of the display panel 10, are further decreased so that these levels has a relationship as shown in FIG. 7A.

As a result thereof, if detection sensitivity is fixed irrespective of the detection spaces, the detection tends to be made difficult in the first detection space S1, the detection distance of which is away farthest from the sensor 20. In order to be able to detect a position of the fingertip even in the first detection space S1 when obtaining sufficient voltage, it is sufficient to enhance the detection sensitivity. If so, however, any oscillation may occur because the detection interval by the detection electrodes narrows in accordance with approach of the fingertip to the surface 10a of the display panel 10 so that the detection sensitivity is increased and in proportion thereto, output voltage is also increased. Therefore, it is preferred that the detection sensitivity ideally may be also controlled based on the detection spaces.

FIG. 8 shows a relationship of the detection level, the detection sensitivity, the detection resolution (thinned-out number of the electrodes) in contrast to the detection spaces.

Detection level when the fingertip enters into the detection space (the first detection space S1) is compared with a first threshold level (reference 1). An initial value of the detection sensitivity is set to its maximum value (maximum gain). Similarly, thinned-out number of the electrodes is set to maximum and the detection resolution is set to lowest one (minimum). When the detection is performed while the fingertip stays in the first detection space S1, the detection level is lowest.

Since the fingertip approaches from the first detection space S1 to the second detection space S2, a second threshold level of the detection level when the fingertip is transferred to the second detection space S2 is set to reference 2. It is determined that the fingertip approaches to the second detection space S2 when the detection level exceeds the second threshold level (reference 2). The detection level is increased. Any gain adjustment is performed so that the detection sensitivity can become middle. At the same time, the thinned-out number of the electrodes is decreased to enhance the detection resolution to its middle level.

In this condition, a locus of the fingertip is detected. When the fingertip reaches the third detection space S3 where the fingertip contacts the surface 10a of the display panel 10 finally, the detection level in this moment exceeds a third threshold level (reference 3). When the detection level exceeds the third threshold level, any gain adjustment is performed so that the detection sensitivity can become lowest. At the same time, the thinning-out processing of the electrodes stops and the contact point is detected with the detection resolution being kept highest.

Thus, the position of the fingertip (object) that stays in a predetermined detection space including a two-dimensional plane of the surface 10a of the display panel 10 from the two-dimensional plane can be surely detected.

Figure 9:
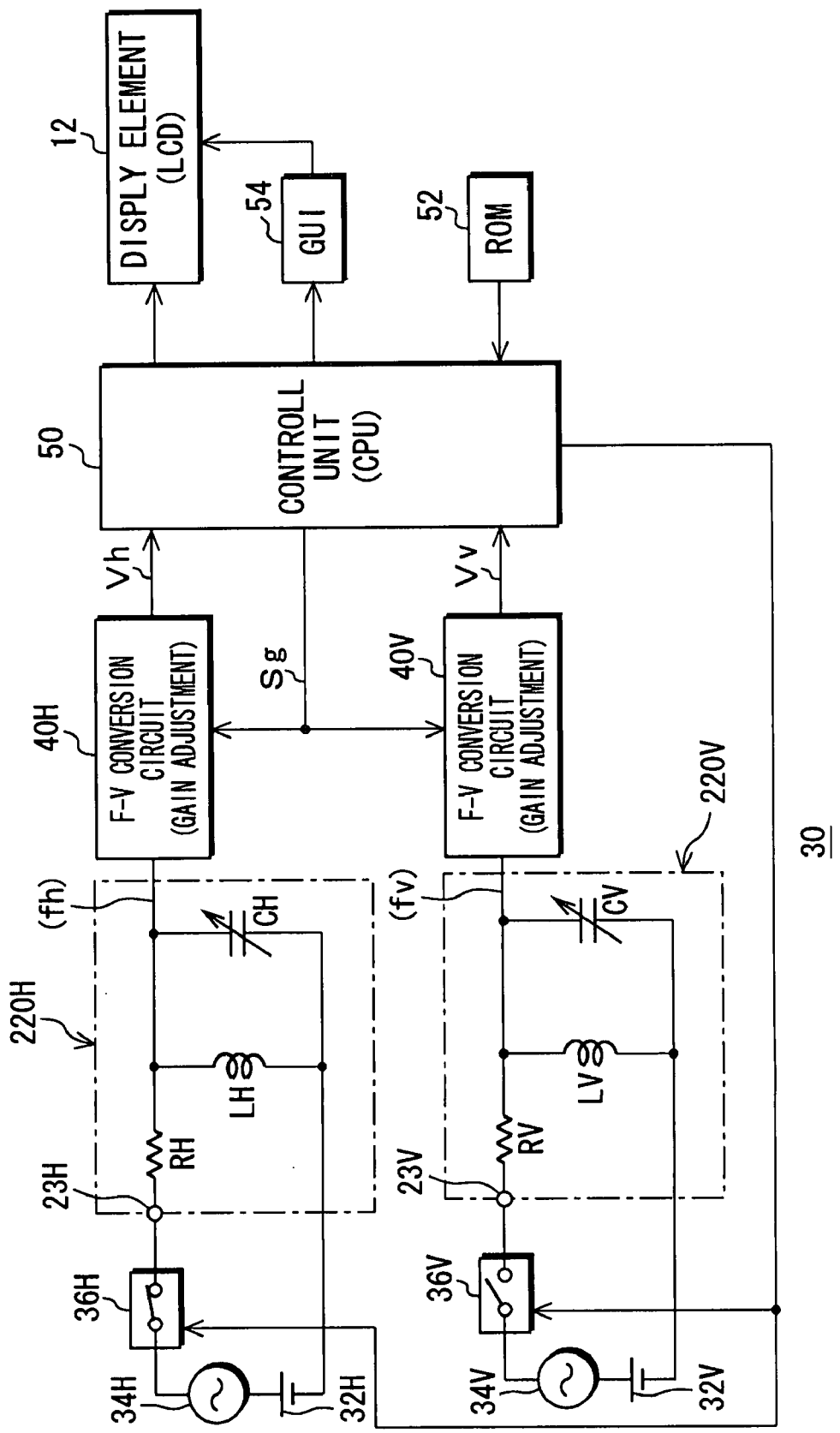
FIG. 9 is a block diagram for showing a configuration of an important portion relative to an embodiment of an information display apparatus with proximity detection performance according to the invention.

FIG. 9 shows a configuration of a process block 30 in an embodiment of the information display apparatus with proximity detection performance according to the invention, by which such the detection process can be realized.

In this embodiment, the detection of the contact point and the projection points in the horizontal electrodes 22H is performed separately from that in the vertical electrodes 22V. Based on any detected values therefrom, the contact point and the projection points can be detected.

It is conceivable that an equivalent circuit 220H on the horizontal electrodes 22H may be an oscillation circuit (a distributed constant circuit) constituted of inductance LH, resistance RH, and capacitor CH. Value of the capacitor CH varies based on the position of the fingertip (from the contact point and the projection points). This variation is detected as a variation of frequency fh. The frequency fh is calculated according to a following expression (1):

$$fh = 1/(2\pi\sqrt{(LH*CH)}) \qquad (1)$$

Similarly, an equivalent circuit 220V on the vertical electrodes 22V may be an oscillation circuit (a distributed constant circuit) constituted of inductance LH, resistance RH, and capacitor CH. The variation of the capacitance CV based on the position of the fingertip can be obtained as the variation of the frequency fv.

An alternating-signal source 34H that is directly connected to the bias 32H is connected as driving source to a common terminal 23H of the equivalent circuit 220H (actually, the horizontal electrodes 22H) through a first switch 36H. The frequency fh in the equivalent circuit 220H on the horizontal electrodes 22H varies based on the position of the fingertip (from the contact point and the projection points), as described above.

The obtained frequency fh is supplied to a frequency-voltage (F/V) conversion circuit 40H where the frequency is converted to any voltage corresponding to a value of the frequency fh. This F/V conversion circuit 40H has also any gain adjustment performance. Adjusting the gain enables the detection sensitivity of a side of the horizontal electrodes 22H to be adjusted consequently. Voltage Vh after conversion (detected voltage) is supplied to a control unit 50 constituted of CPU and the like.

A similar detection system is also provided to the vertical electrodes 22V. Accordingly, an alternating-signal source 34V that is directly connected to the bias 32V is connected to a common terminal 23V of the equivalent circuit 220V (actually, the vertical electrodes 22V) through a second switch 36V.

The obtained frequency fv is supplied to a frequency-voltage (F/V) conversion circuit 40V where the frequency is converted to any voltage corresponding to a value of the frequency fv. This F/V conversion circuit 40V has also any gain adjustment performance. Adjusting the gain enables the detection sensitivity of a side of the vertical electrodes 22V to be adjusted consequently. Voltage Vv after conversion (detected voltage) is supplied to a control unit 50.

In order to obtain the frequencies fh, fv of the equivalent circuits 220H, 220V on the horizontal and vertical electrodes 22H, 22V alternately, the control unit 50 generates a switching signal to switch the first and second switches 36H, 36V alternately. The control unit 50 also generates a control signal Sg to perform the gain adjustment on the F/V conversion circuits 40H, 40V, thereby performing the gain adjustment by the same amount at the same time. The detection resolutions are switched coinciding with this gain adjustment.

A memory (for example, read only memory (ROM)) that is provided in connection with the control unit 50 stores any kinds of plural process programs to perform the above-mentioned detection process and/or various kinds of display process. Although the control unit 50 controls a display on the display elements 12, any graphic user interface (GUI) 54 supplies the display elements 12 with GUI signals and a predetermined display mode is performed therein.

Figure 10:
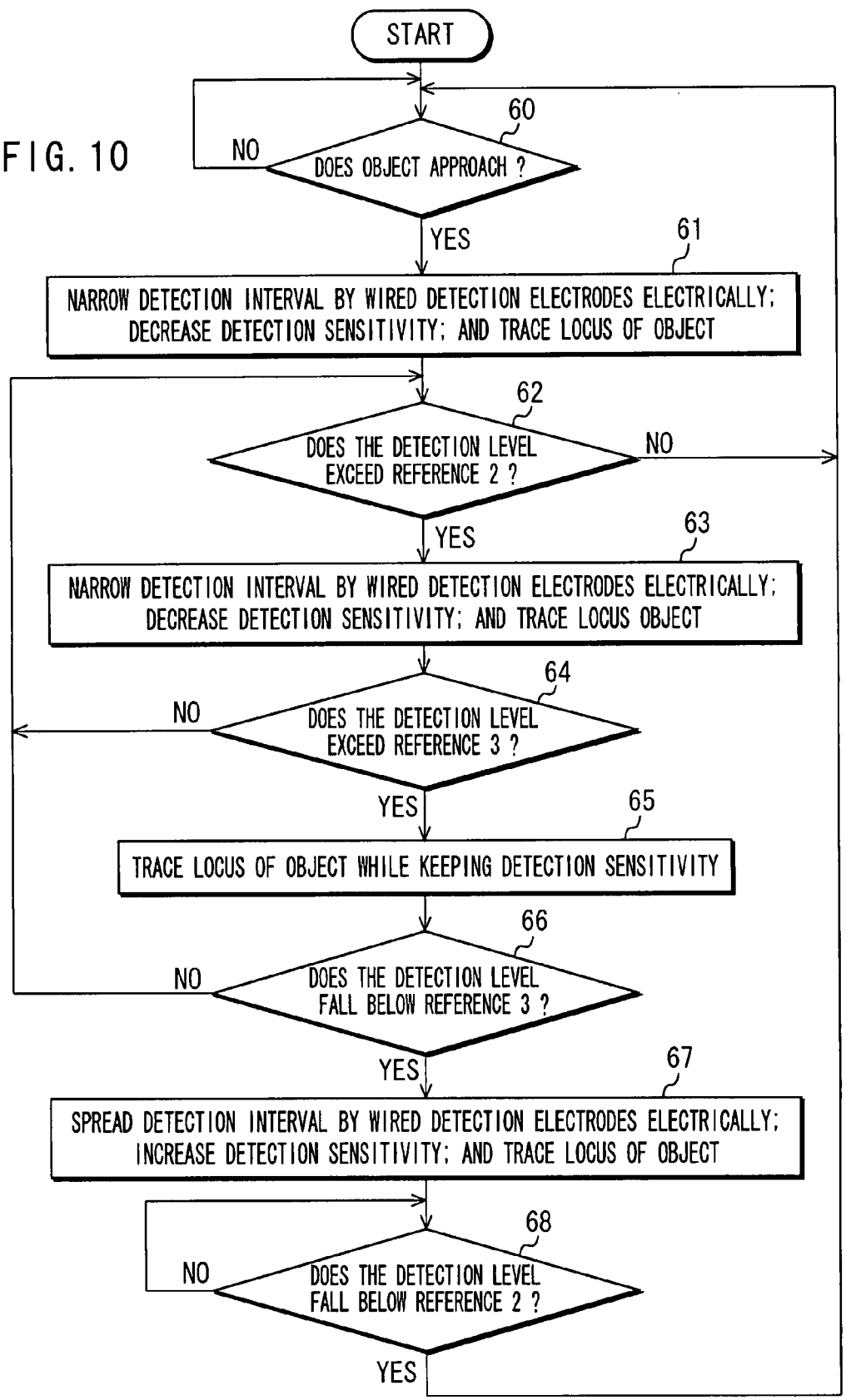
FIG. 10 is a flowchart for showing an embodiment of a display process.

The following will describe an execution procedure of the above-mentioned detection process (an information display method) with reference to FIG. 10.

In a flowchart shown in FIG. 10, at step 60, an approach of the user's fingertip (object) is first detected. If the detection level exceeds the reference 1 (the first threshold level), the process goes to a next step 61 where a detection interval by the detection electrodes is electrically limited to narrow so that the detection resolution is changed to adjust the detection sensitivity. Under this condition, a locus of the fingertip is traced. This is because a display state of a displayed image on the display element 12 can be controlled based on the trace signal.

Next, the detection level is checked and if the detection level exceeds the reference 2 (the second threshold level) at step 62, the detection interval by the detection electrodes is adjusted as to be further limited electrically to narrow so that the detection sensitivity is adjusted to decrease its value at step 63. In this moment, a locus of the fingertip is also traced so that a displayed image can be controlled based on the trace signal.

If the detection level exceeds the reference 3 (the third threshold level) at step 64, the detection interval by the detection electrodes is adjusted as to become minimum and the detection resolution is also adjusted as to become maximum. While the detection sensitivity is set to lowest, a locus of the fingertip that contacts the surface 10a of the display panel 10 is then traced at step 65. This is because it is conceivable that a display state of a displayed image may be controlled when the fingertip follows the surface 10a of the display panel 10 with the fingertip contacting the surface 10a of the display panel 10.

At the step 65, the detection level is further checked and conversely, if the detection level falls below the reference 3 (the third threshold level) at step 66, it is determined that the fingertip is released from the surface 10a of the display panel 10. In this moment, the detection interval by the detection electrodes and the detection sensitivity are returned to their states in the step 63 and the detection process is continued at step 67.

Under the state of the step 67, the detection level is again checked and if the detection level falls below the reference 2 (the second threshold level) at step 68, it is determined that the fingertip is released from the detection space S2 over the surface 10a of the display panel 10. In this moment, the detection interval by the detection electrodes is returned to its maximum and the detection resolution is returned to its initial value. Further, the detection sensitivity is also returned to its maximum (initial value), so that the approach of the fingertip can be detected at the step 60.

At the step 62, if the detection level falls below the reference 2 (the second threshold level), it is determined that the fingertip is released from the surface 10a of the display panel 10. In this moment, the process goes to the step 60. At the step 64, if the detection level falls below the reference 3 (the third threshold level), it is determined that the fingertip is released from the surface 10a of the display panel 10. In this moment, the process goes to the step 62. Similarly, at the step 66, if the detection level falls below the reference 3 (the third threshold level), it is determined that the fingertip is released from the surface 10a of the display panel 10. In this moment, the process also goes to the step 62.

The following will describe display process in the information display apparatus 1 with proximity detection performance according to an embodiment of the invention. Since the spatial position of the fingertip can be detected over the surface 10a of the display panel 10 as described above, a display state of information (image) displayed on the display element 12 can be controlled based on the spatial position, a motion of the fingertip, and/or its locus.

Accordingly, the information display apparatus 1 has, in addition to the display device that displays image information, a sensor of capacitance type that is constituted of plural detection electrode, the sensor being provided on a surface of the display device; a control device that controls output of the detection electrodes; and an administration device that administrates activation or non-activation of detection electrodes. If the sensor of capacitance type detects no object, the control device controls the output of the detection electrodes to increase the output to their maximum and the administration device performs processing to make the detection interval by the detection electrodes maximum. If the sensor of capacitance type detects the object, the control device controls the output of the detection electrodes to decrease the output based on the distance between the detected object and the detection electrodes and the administration device performs processing to make the detection interval by the detection electrodes narrower.

Accordingly, the control unit 50 performs at least the following process steps (1) through (4) in order to realize the above-mentioned detection process and display process:

(1) a step of detecting the contact point of the fingertip (object) to the sensor 20 and the spatial position of the fingertip opposite to the surface 10a of the display panel 10;

(2) a step of adjusting the detection resolution to be detected based on the detected spatial position of the fingertip over the surface 10a of the display panel 10;

(3) a step of adjusting the detection sensitivity; and (4) a step of controlling image information displayed on the display element 12 in its size, motion, rotation direction, and the like based on the detected locus of the fingertip within the detection area.

The following will describe display-controlling examples of the image displayed on the display element 12. It is supposed in each of the display-controlling examples that a display is controlled, which will be described later, while a particular display control program is selected among display control programs stored in the memory 52 as shown in FIG. 9 and started.

Display-Controlling Example 1

Figure 11A:
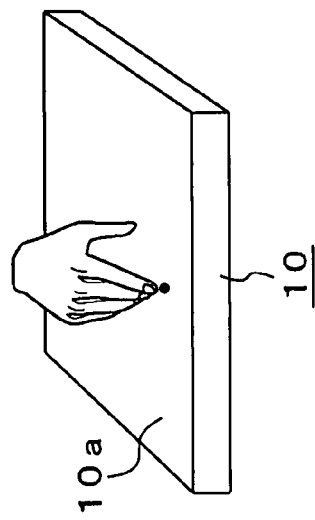
FIGS. 11A through 11F are diagrams each for illustrating a first display-controlling example.
Figure 11C:
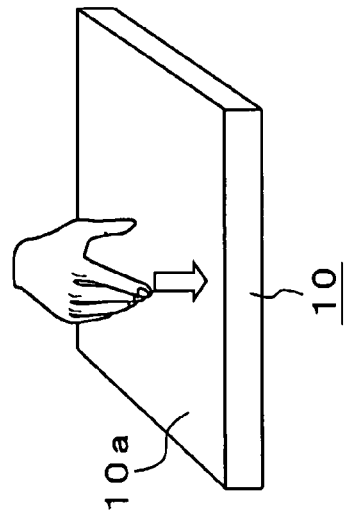
Figure 11E:
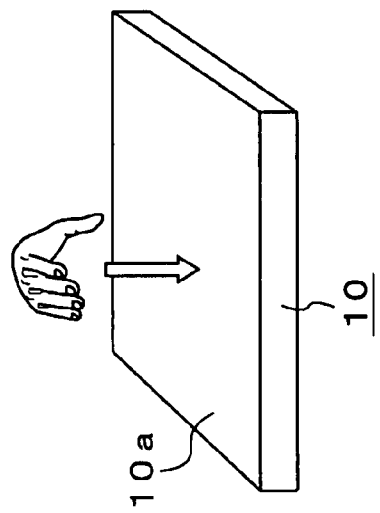
Figure 11B:
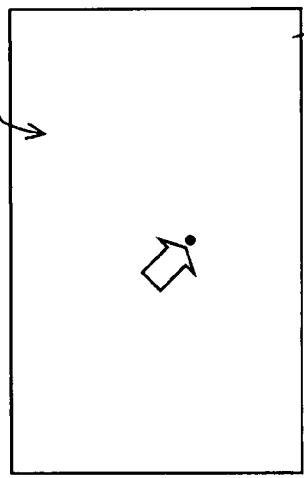

FIGS. 11A through 11F show an example where if the fingertip is detected in the first detection space S1, a display is controlled so that an entire screen is slightly luminous after switching the screen into its display mode (see FIGS. 11A and 11B). This is one of the control modes, for example, from a sleep mode to the display mode.

Figure 11D:
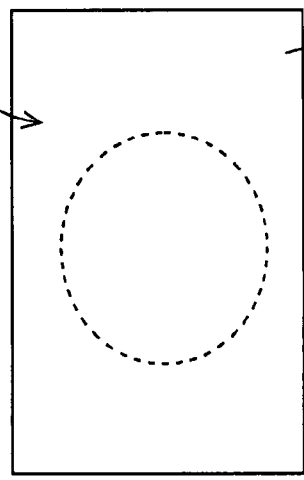

If the fingertip approaches the surface 10a of the display panel 10 and is detected in the second detection space S2, the display is now controlled so that light is focusing around a projection point of the fingertip (see FIGS. 11C and 11D).

Figure 11F:
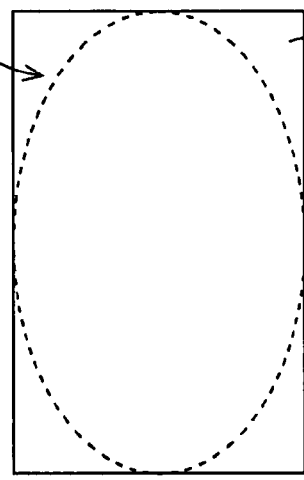

If the fingertip contacts the surface 10a of the display panel 10, a pointer is displayed (see FIGS. 11E and 11F).

Thus, in the example shown in FIGS. 11A through 11F, the display is controlled by any motion of the fingertip, which is applicable to a case where it has been switched to the sleep mode because a particular application software has started previously.

Display-Controlling Example 2

Figure 12A:
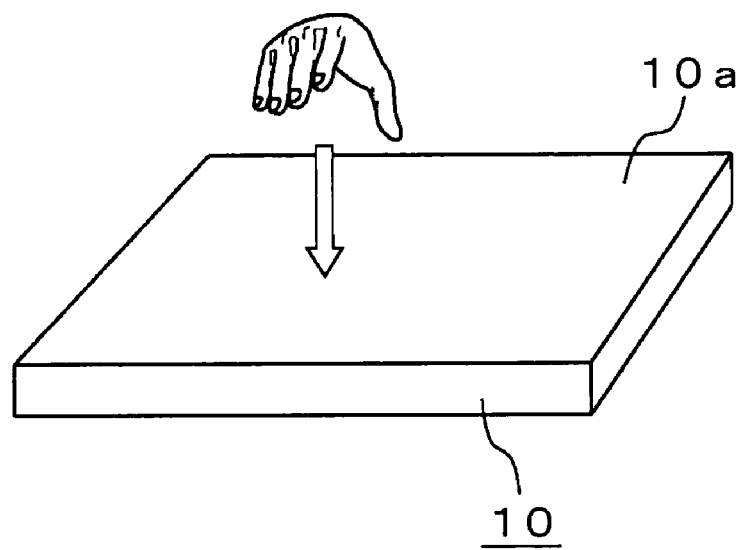
FIGS. 12A and 12B are diagrams each for illustrating a second display-controlling example (No. 1)
Figure 12B:
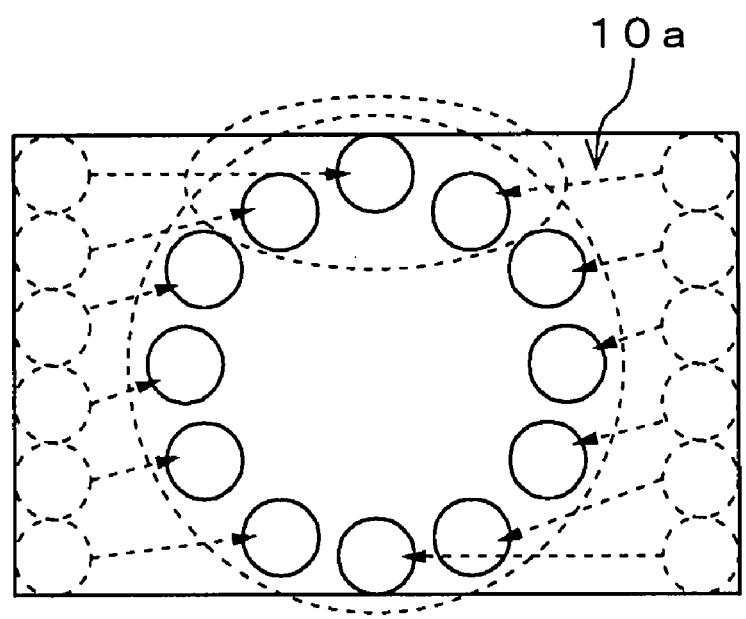

FIGS. 12A and 12B show an example (NO. 1) where if it is detected that, for example, the fingertip enters into the first detection space S1 with plural icons being represented as circles on both right and left sides of the screen, the display is controlled so that the icons represented on both sides thereof can be arranged along a circumference of a circle having a center, which corresponds to a middle of the screen. When the fingertip contacts a particular icon, application software relative to this icon can start in response thereto.

Figure 13A:
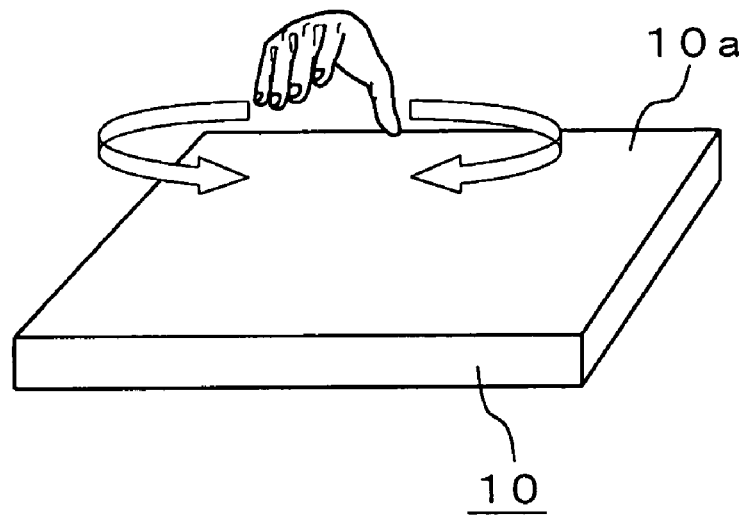
FIGS. 13A and 13B are diagrams each for illustrating the second display-controlling example (No. 2)
Figure 13B:
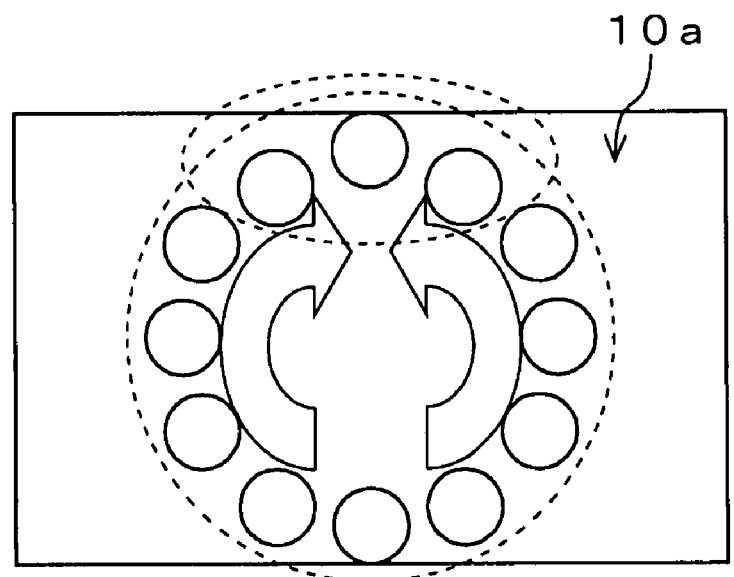

FIGS. 13A and 13B show an example (NO. 2) where if the fingertip rotates in the second detection space S2, the display is controlled so that the plural icons represented as circles that are arranged along a circumference of a circle having a center, which corresponds to a middle of the screen, as shown in FIG. 12, are also rotated in synchronism with the rotation direction and the rotation speed of the fingertip along the same direction (a direction indicated by any arrows shown in FIG. 13B) as that of the fingertip.

Figure 14A:
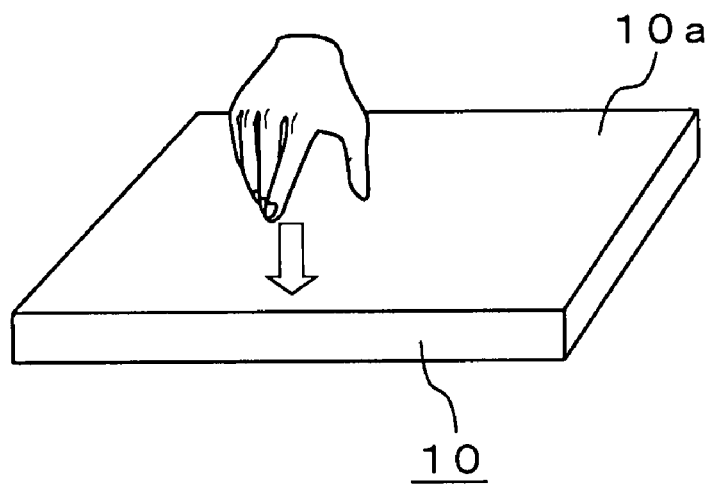
FIGS. 14A and 14B are diagrams each for illustrating the second display-controlling example (No. 3)
Figure 14B:
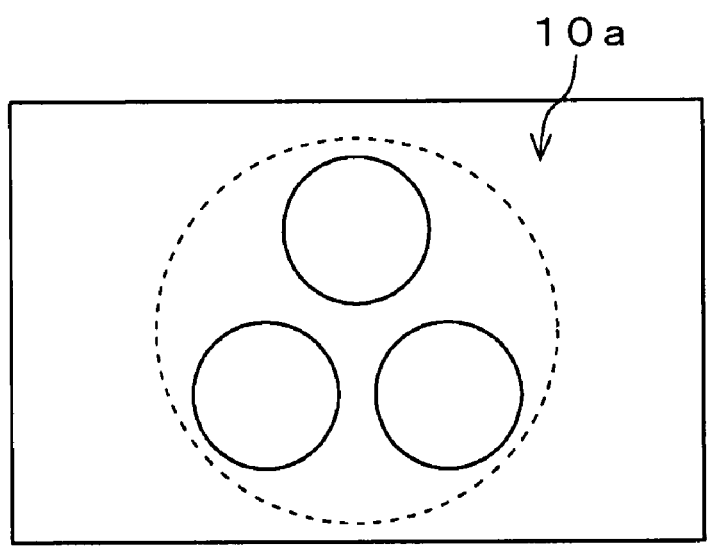

FIGS. 14A and 14B show an example (NO. 3) where if the fingertip approaches toward a particular icon to enter into the second detection space S2 (see FIG. 14A), the display is controlled so that three icons including this particular icon and in front of and behind the particular icon are expanded and radially displayed from the middle of the screen (see FIG. 14B). In this moment, the fingertip is position at a center of the icon.

Figure 15A:
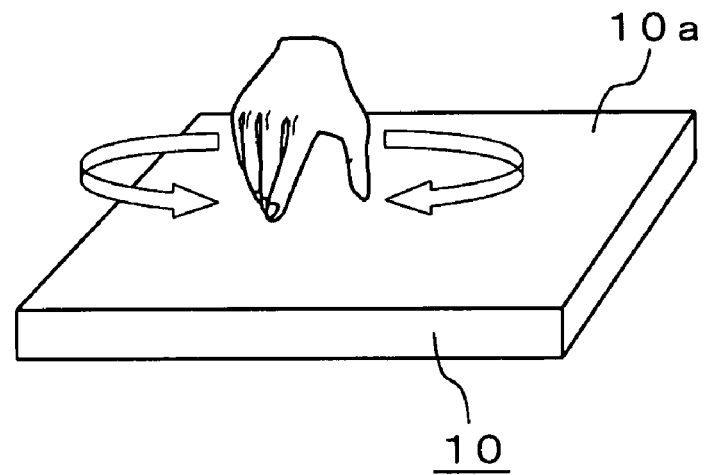
FIGS. 15A and 15B are diagrams each for illustrating the second display-controlling example (No. 4)
Figure 15B:
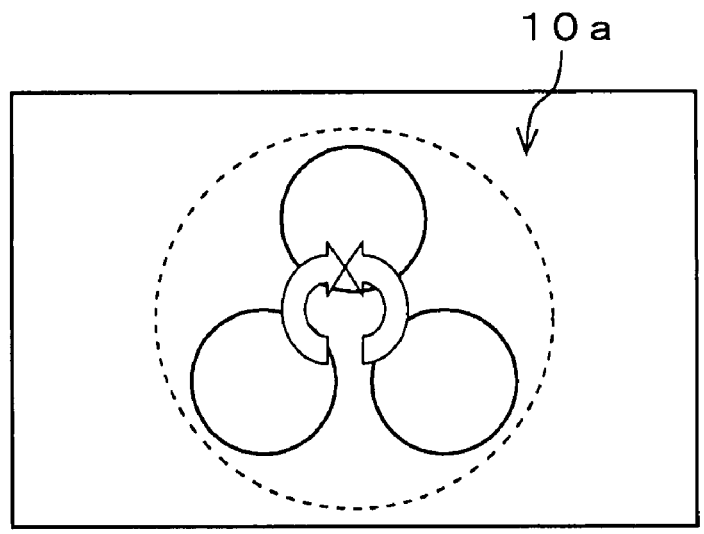
Figure 16A:
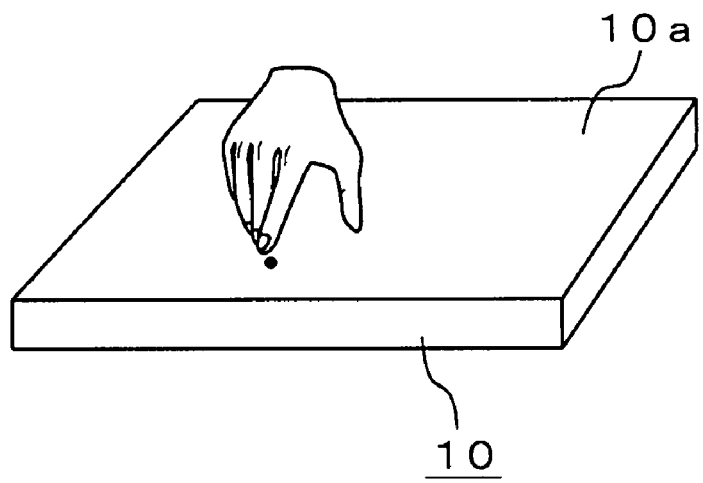
FIGS. 16A and 16B are diagrams each for illustrating the second display-controlling example (No. 5-1)
Figure 16B:
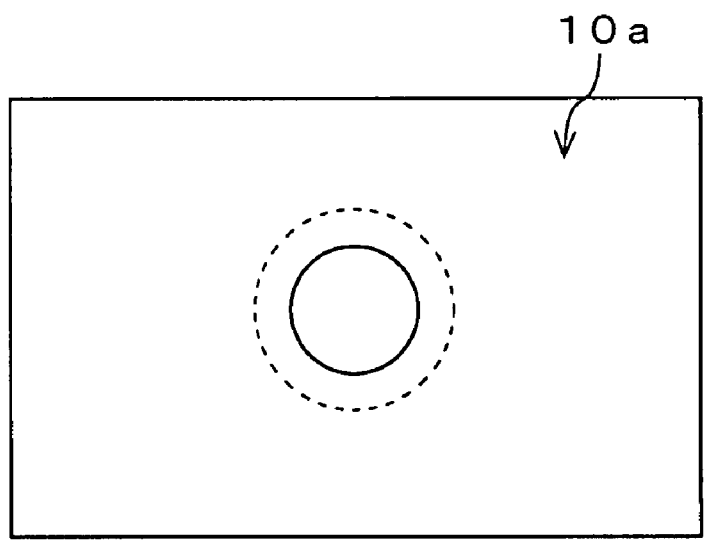

FIGS. 15A and 15B show an example (NO. 4) where if the fingertip is rotated under the display state shown in FIGS. 12A, 12B, the display is controlled so that the icons are also rotated along a rotation direction identical to that of the fingertip (see FIGS. 15A, 15B). This enables a user to display the icon on a representation position that is most suitably operated by the user.

Figure 17A:
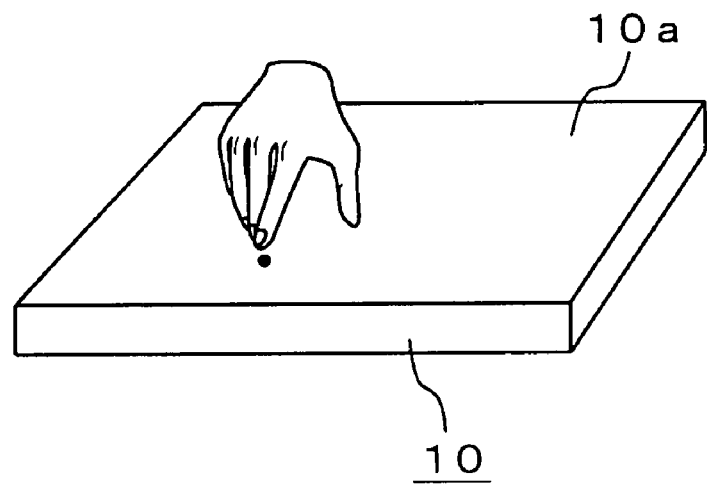
FIGS. 17A and 17B are diagrams each for illustrating the second display-controlling example (No. 5-2)
Figure 17B:
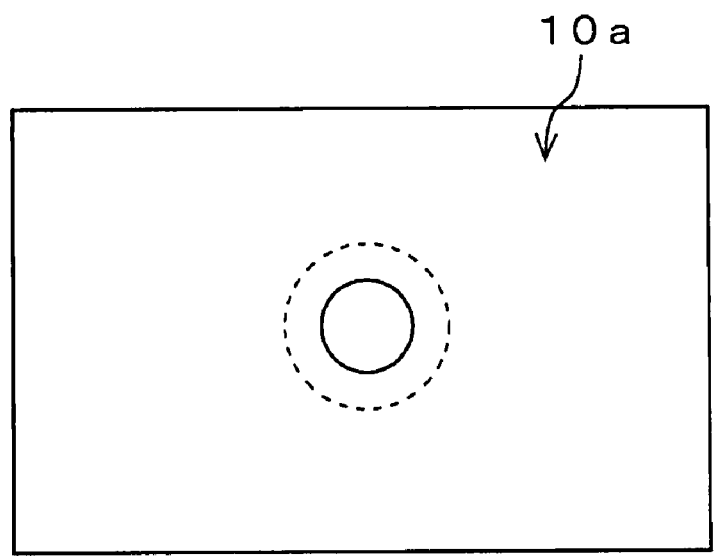

FIGS. 16A, 16B, 17A and 17B show an example (NO. 5) where if the fingertip contacts the particular icon displayed on the surface 10a of the display panel 10 when display positions thereof alter to make it easy to select the particular icon under the display state shown in FIGS. 15A, 15B, the display is controlled so that only the particular icon is displayed (see FIGS. 16A, 16B) and this icon is concentrated to the fingertip (see FIGS. 17A, 17B).

Thus, detecting the spatial position of the fingertip and tracing its locus enables to be realized any new interactive display that nobody has been experienced until now.

Another Display-Controlling Example

A display-controlling example similar to the display-controlling example 2, which is not shown, can be provided as follows:

If the fingertip approaches to the first detection space S1 in which the spatial position of the fingertip can be detected, a particular menu screen is displayed on the two-dimensional display element 12.

If the fingertip moves, for example, rotates in the first detection space S1, the menu screen rotates at a rotation speed and a rotation direction corresponding to the rotation speed and the rotation direction of the fingertip. This rotation does not mean any special something.

If the fingertip further approaches to the surface 10a of the display panel 10 passing through the detection space S1 so that it is determined that the fingertip stays in the second detection space S2, the menu screen is expanded and displayed so that only an image relative to a part of the menu items is displayed. In this case, if the fingertip moves, the image of this menu item also moves corresponding to its locus. If the fingertip finally contacts the surface 10a of the display panel 10 on which the particular menu item is displayed at the third detection space S3, the menu item displayed on its contact point of the surface 10a of the display panel 10 is selected. This enables such the interactive display control to be realized.

Figure 18:
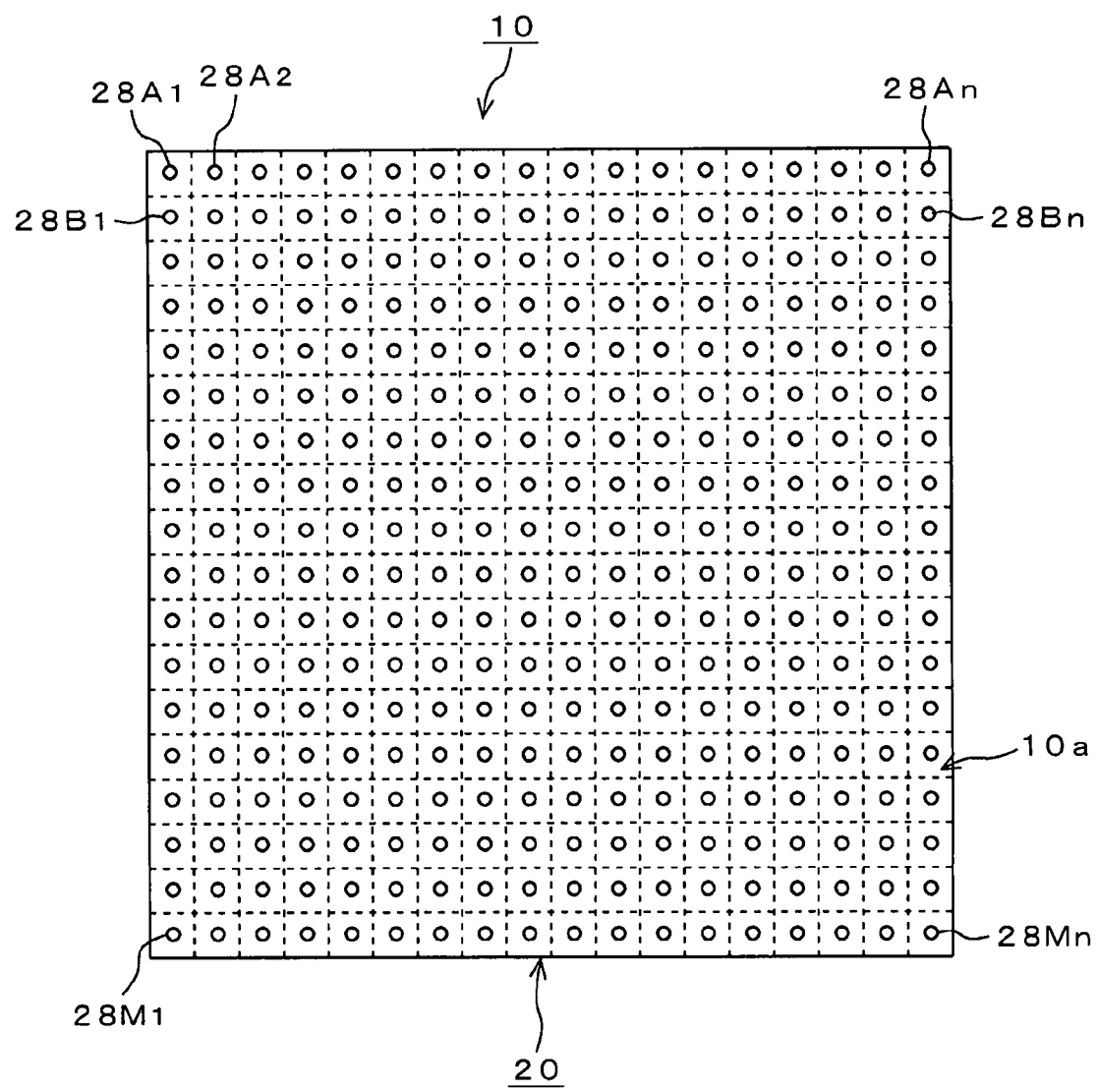
FIG. 18 is a plan view of another embodiment of an information display apparatus with proximity detection performance according to the invention, in which point electrodes are used as the detection electrodes.

Although the transparent wired electrodes 26H, 26V have been used as the detection electrodes with them being arranged in matrix, any point electrodes may be used in place of the wired electrodes 26H, 26V. FIG. 18 shows a display panel 10 used in another embodiment of an information display apparatus 1 with proximity detection performance according to the invention, in which the point electrodes are used as the detection electrodes.

Figure 19:
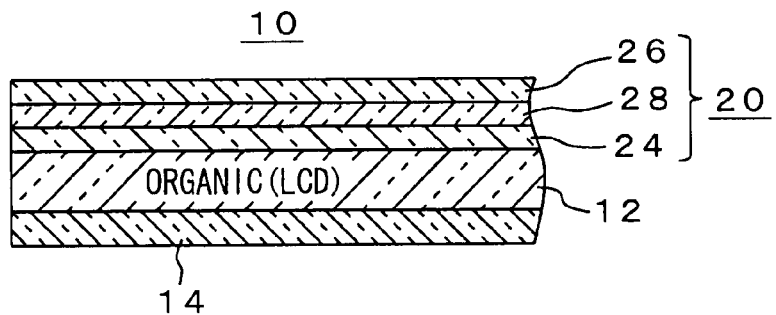
FIG. 19 is a sectional view of an example of a display device, which is used in the above-mentioned another embodiment of an information display apparatus with proximity detection performance according to the invention, for showing an important portion thereof.

The point electrodes are arranged so that they are arrayed as m lines by n columns as shown in FIG. 18. FIG. 19 is a sectional view of an example of the display panel 10 using the point electrodes 28, which is used in the above-mentioned another embodiment of an information display apparatus 1 with proximity detection performance according to the invention.

As the display element 12, a transparent two-dimensional display element such an organic EL display element can be used in addition to the LCD. The embodiments following that shown in FIG. 19 use the organic EL display element. The sensor 20 is adhered to a surface of the display element 12.

The sensor 20 is configured so that the point electrodes (actually, a group of the point electrodes) are sandwiched between a pair of the plate glasses 24, 26. The point electrodes 28 are configured as to become a variable oscillator in order to act as the sensor of capacitance type. Since all of the point electrodes 28 have an identical configuration to each other, a configuration of only a point electrode 28A1 will be described.

Figure 20:
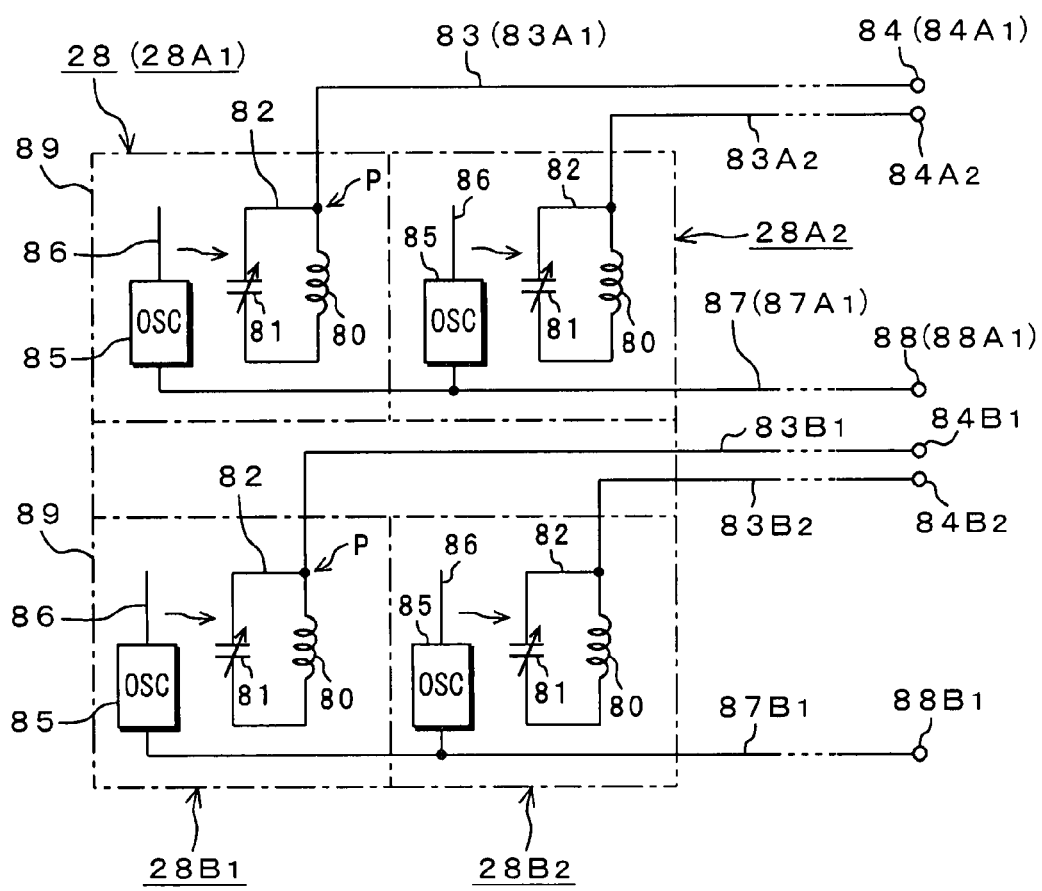
FIG. 20 is a circuit diagram of the point electrodes.

The point electrode 28A1 is constituted of a coil 80 and a capacitor 81, in this embodiment, a chip coil and a chip capacitance, which are connected to each other in parallel through an electric conductive layer 82 and mounted on a glass substrate 24, to provide a resonance circuit, and an oscillator 85, in this embodiment, a chip oscillator, that is arranged near the capacitor 81, as shown in FIG. 20. They are formed as a variable oscillator as a whole. The oscillator 85 contains a crystal oscillator or a ceramic oscillator and an amplifier relative to them. To the oscillator 85, an electric conductive layer 86 having a predetermined length is connected.

A lead electric conductive layer 83A1 is derived from a connection point "p" and it is connected to an output terminal 84A1 provided at an end of the sensor 20. A predetermined operating voltage is applied to the oscillator 85 from a voltage terminal 88A1 through an electric conductive layer 87A1 in order to operate the oscillator 85.

Other point electrodes 28A2, 28B1, 28B2, . . . , 28Nm have the same configuration as that of the point electrode 28A1 and output terminals 84 (84A1, 84A2, . . . , 84Mn) are respectively derived from all of the point electrodes 28. Since the same voltage is applied to each of the point electrodes 28, power terminals 88 (88A1, 88A2, . . . , 88Mn) are provided as a common power terminal.

According to such the configuration, the electric conductive layer 86 and the electric conductive layer 82 for parallel connection respectively act as antennas so that the oscillator 85, the coil 80, and the capacitor 81 can be electrically connected to each other.

Thus, the point electrode 28A1 acts as an oscillator and capacitance of the capacitor 81 varies based on a position of the fingertip that moves toward the plane glass 26, namely, the surface 10a of the display panel 10, so that an oscillation frequency fh also varies based on the position of the fingertip. In other words, the point electrode 28A1 acts as a frequency variable oscillator. Its reference oscillation frequency fo is an oscillation frequency of its oscillator.

It is to be noted that an area 89 indicated by chain lines shown in FIG. 20 is a partition plate, which indicates a size of each of the point electrodes 28 and acts as a barrier for preventing any oscillation output from being unnecessarily radiated to any adjacent point electrodes 28. Thus, by the partition plate 89, the adjacent point electrodes 28 can detect approach, distance, and contact of the fingertip separately without any interferences to each other. In a case shown in FIG. 20, the electric conductive layers 82, 86 are connected to each other.

In the display panel 10 shown in FIG. 18, the detection resolution can be switched according to approach, distance, and contact of the fingertip. FIG. 18 shows the detection electrodes when it is determined that the fingertip stays in the third detection space S3, which have a narrowest detection interval by the detection electrodes.

Figure 21:
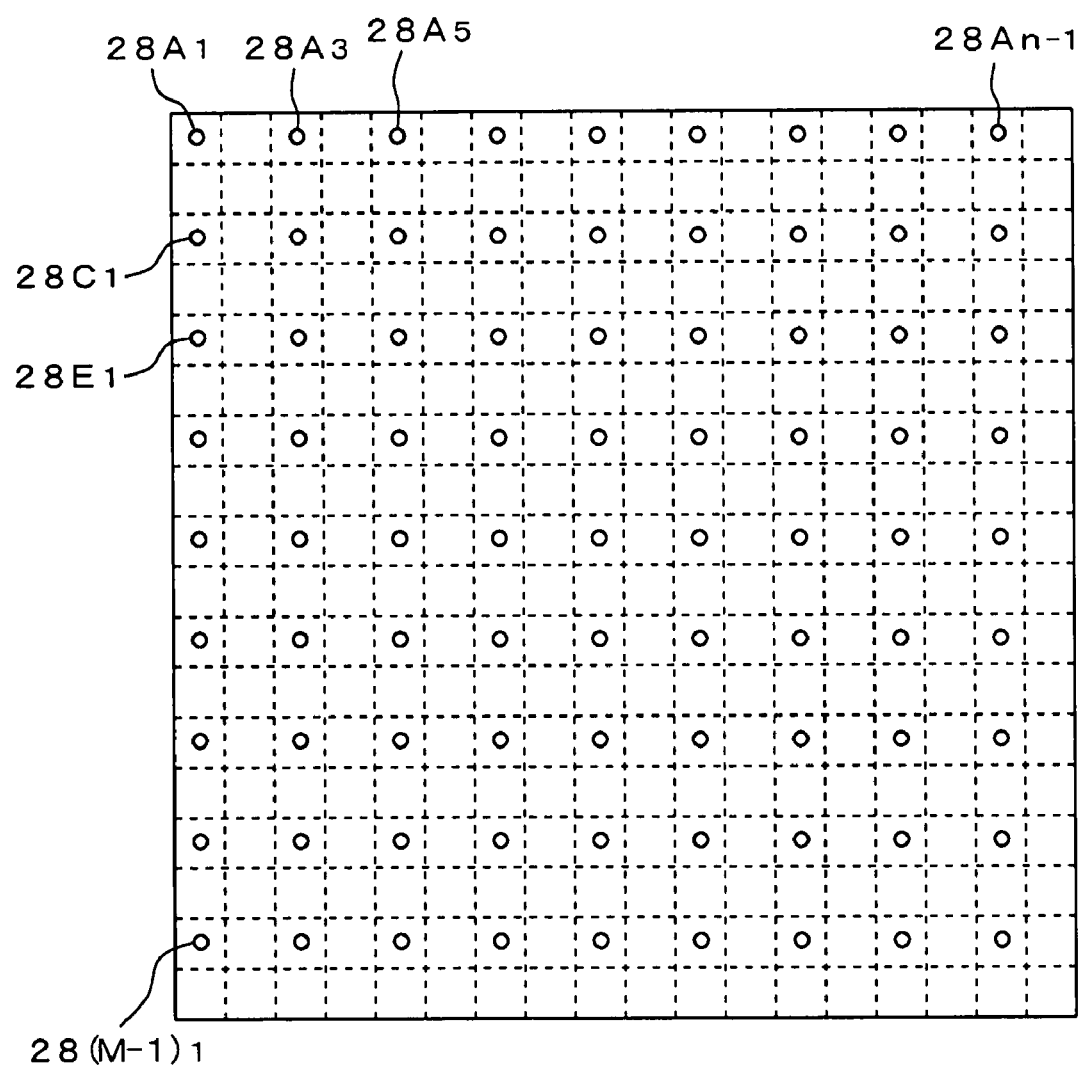
FIG. 21 is a plan view of an important portion of the above-mentioned another embodiment of an information display apparatus with proximity detection performance according to the invention when an object stays in a second detection space in a case where the point electrodes are used as the detection electrodes.
Figure 22:
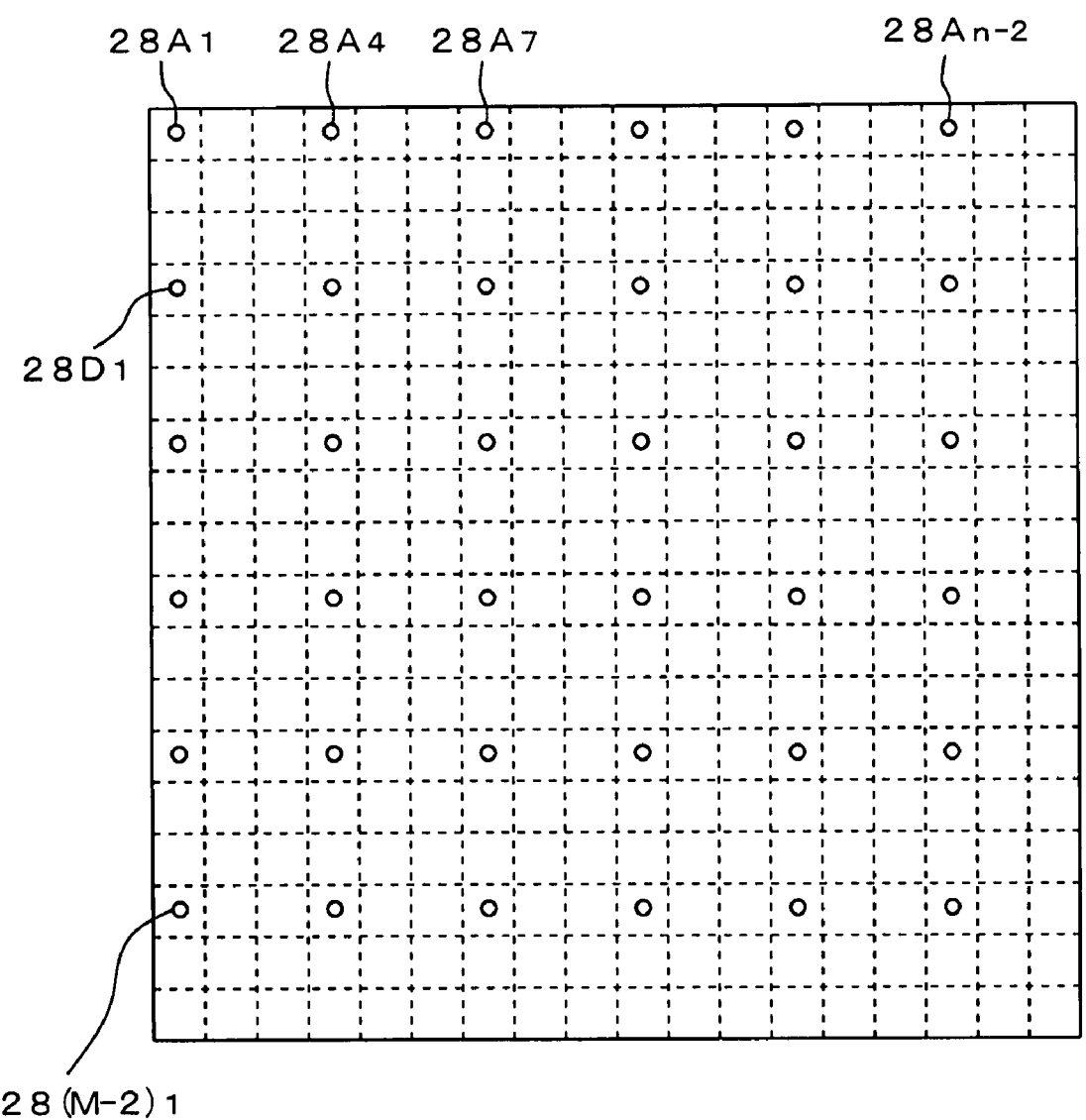
FIG. 22 is a plan view of an important portion of the above-mentioned another embodiment of an information display apparatus with proximity detection performance according to the invention when an object stays in a first detection space in a case where the point electrodes are used as the detection electrodes.

The detection resolution is adjusted as follows. When it is determined that the fingertip stays in the second detection space S2, the number of electrodes are electrically thinned out. For example, as shown in FIG. 21, the electrodes are used as the detection electrodes every other electrode. When it is determined that the fingertip stays in the first detection space S1, the electrodes are further thinned out electrically. For example, as shown in FIG. 22, the electrodes are used as the detection electrodes every third electrode.

Figure 23:
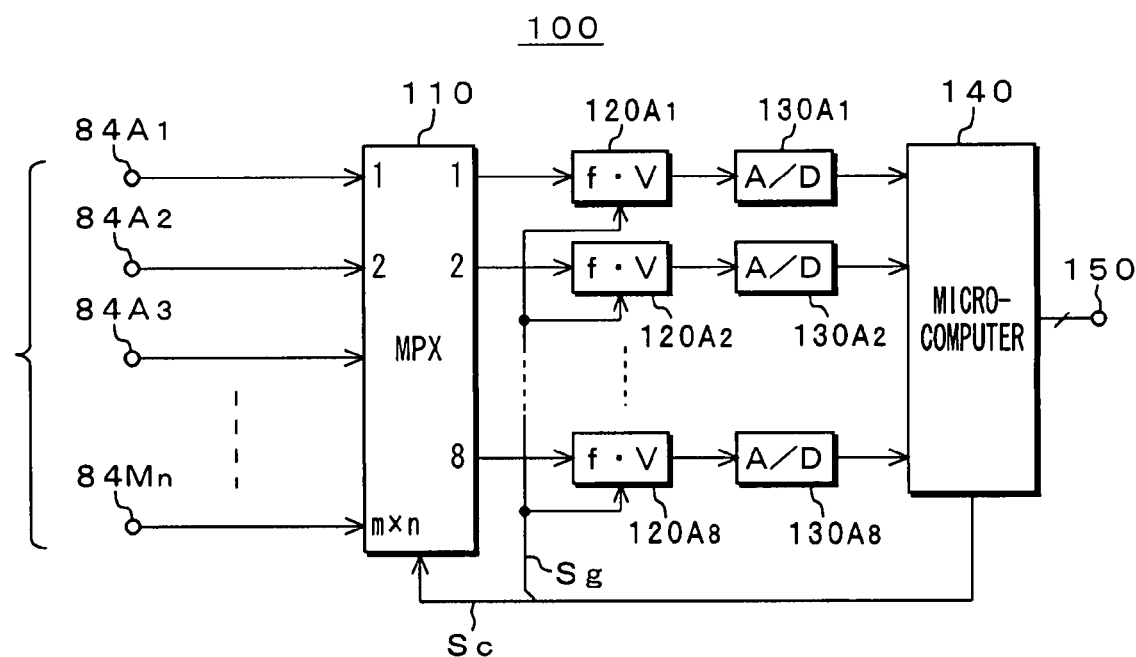
FIG. 23 is a block diagram for showing an important portion of the above-mentioned another embodiment of an information display apparatus with proximity detection performance according to the invention when the point electrodes are used.
Figure 24:
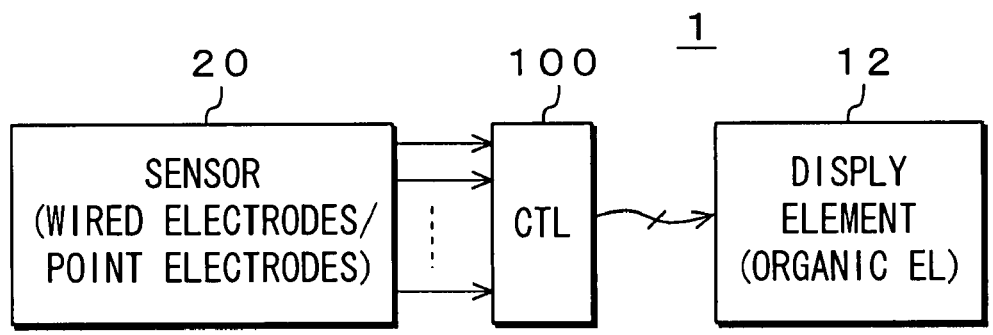
FIG. 24 is a block diagram for showing an important portion of the above-mentioned another embodiment of an information display apparatus with proximity detection performance according to the invention when a sensor is configured as to be separated from a display device.

FIG. 23 shows an important portion of a control processing circuit 100 used in the above-mentioned another embodiment of an information display apparatus 1 with proximity detection performance according to the invention. The group of point electrodes is formed as to have configuration of m lines by n columns. In a case of FIG. 18, m=n=18. The output terminals 28A1 through 28Mn respectively derived from a plurality of the point electrodes are connected to input terminals of multiplexer (MPX) 110 and any frequency components obtained by the output terminals 28A1 through 28Mn are supplied to the MPX 110. To the MPX 110, r numbers (=p*q) of frequency to voltage conversion circuits 120A1 through 120Ar are connected. Herein, m*n>>r, in this embodiment, r=9.

The MPX 110 switches its inputs at a high speed. In other words, any high speed scanning is performed. This enables the frequency components corresponding to the point electrodes to be assigned to any frequency to output stage in the frequency to voltage conversion circuits 120 that are much limited in number as compared with numbers of the input. Because of r=9, the frequency components obtained by all of the point electrodes of at least two columns are successively processed by one frequency to voltage conversion circuit 120.

In other words, if the detection resolution is highest in the third detection space S3, one frequency to voltage conversion circuit 120 handles the point electrodes of 2 by 18, which is of two columns. If the detection resolution is middle in the second detection space S2, one frequency to voltage conversion circuit 120 handles the point electrodes of 2 by 9, which is thinned out of two columns. If the detection resolution is lowest in the first detection space S1, one frequency to voltage conversion circuit 120 handles six point electrodes, which corresponds to a first of two columns, obtained by thinning-out up to a quarter. By such the conversion based on the high speed switch processing, information from all of the point electrodes can be converted to voltage by limited number of any circuits.

These frequency to voltage conversion circuits 120 also have a gain adjustment function, thereby enabling output gains to be automatically adjusted based on the detection spaces.

After the frequency components have been converted to the voltage, A/D converters 130A1 through 130A8 convert the voltage to digital data respectively and the digital data is supplied to a data-processing unit 140 constituted of a microcomputer.

The data-processing unit 140 supplies the MPX 110 with a high-speed switching signal Sc. The data-processing unit 140 also supplies these respective frequency to voltage conversion circuits 120 with a gain adjustment signal Sg corresponding to the detection spaces. This enables the data-processing unit 140 to obtain pieces of the detection information successively from the corresponding point electrodes 28 to specify the detection spaces and the contact point. An output (detection output) is then supplied to the above-mentioned display element 12 through an output terminal 150 as a control signal.

Although the embodiments of the information display apparatus 1 with proximity detection performance according to the invention have integrally configured so that the sensor 20 can be adhered to the surface of the display element 12 in the above embodiments, this invention is not limited thereto. The information display apparatus 1 with proximity detection performance may have a configuration such that the sensor 20 can be separated to the display element 12.

Such the information display apparatus 1 contains a sensor 20, a control processing circuit 100 to which the sensor 20 supplies its output, and a display element 12 to which the control processing circuit 100 supplies its detection output. Relative to the display element 12, only a display panel is illustrated for convenience. The detection output is not supplied directly to the display element 12, but to an image-display-processing system, not shown, thereby enabling any control to be realized corresponding to the detection output.

The control processing circuit 100 may be integral with the sensor 20 or the display element 12, or separated from them. In the following description, an embodiment such that the control processing circuit 100 is separated from them will be described. As the detection electrodes used for the sensor 20, transparent wired electrodes or point electrodes are used.

As the display panel, an LCD display element or an organic EL display element may be used. In the following description, a case where the organic EL display element constituted of transparent material, through which a back side can be seen on its non-display state, is used will be illustrated.

The following will describe uses (used examples) of the information display apparatus 1 in which the control processing circuit 100 is separated from the sensor 20 or the display element 12 with reference to FIGS. 25 through 29.

Figure 25:
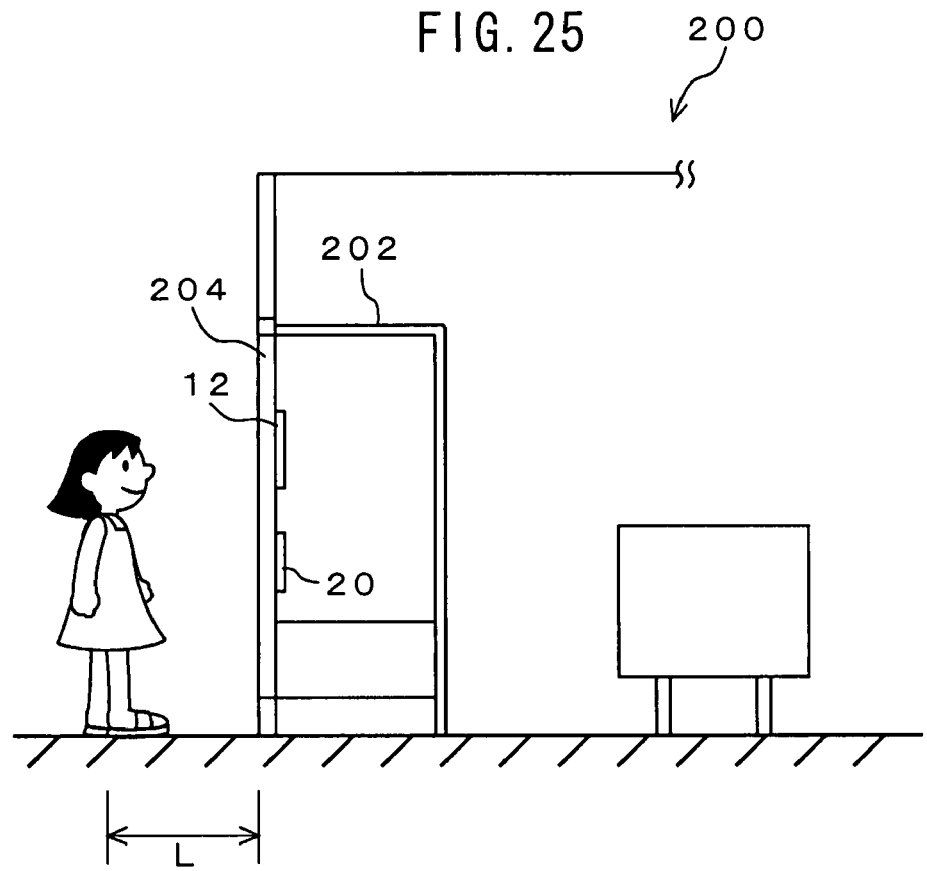
FIG. 25 is a conceptual diagram for showing a case where the above-mentioned another embodiment of the information display apparatus in which the point electrodes are used is attached to a display window.

FIG. 25 shows a first use thereof. In the first use, the information display apparatus 1 is used for advertisement of an article displayed or exhibited in a shop window. Accordingly, the sensor 20 is arranged at a position, from which an approach of a walker can be detected, in a front glass (transparent glass) 204 of the shop window 202, which is installed in a wall of a building 200. The display element 12 is positioned at a position meeting an eye level of the walker.

Since a back side of the display element 12 can be seen through the display element 12 on its non-display state, the article displayed or exhibited in the shop window 202 can be seen through the display element 12.

Figure 26:
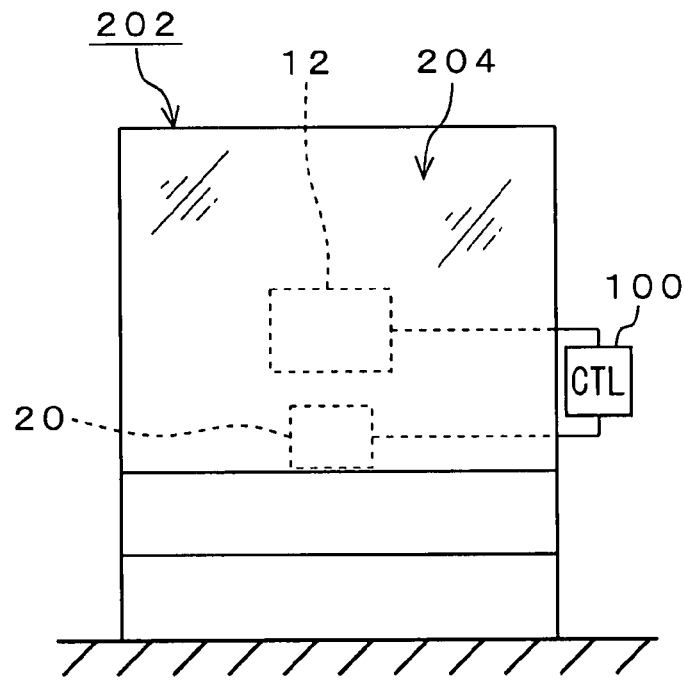
FIG. 26 is a front view of the display window shown in FIG. 25.

In order to make it easy to detect the approach of the walker working on a footpath, as shown in FIG. 26, the sensor 20 may be positioned at a position of the front glass 204 under the middle thereof and the display element 12 is positioned an appropriate position of the front glass 204 over the sensor 20.

In order to enable the detection of the approach of the walker to be made easy, the minimum interval between the point electrodes constituting the sensor 20 is set to relatively wider one. In this embodiment, it is set to about 10 through 20 cm and the numbers of the electrodes are set to about 10 and arranged in matrix. This enables the first detection space S1 to be expanded up to about 40 through 80 cm from the front glass 202, thereby enabling an intentional approach of the walker to the ship window 202 to be sufficiently detected. If so, the second detection space S2 becomes about 20 through 40 cm.

When it is determined that the walker approaches to the first detection space S1, an image for presentation of the exhibited article, for example, wear, is displayed on the display element 12. Simultaneously, this article may be presented by sound. When it is determined that the walker approaches to the second detection space S2, it is switched to an image for presentation of contents in the exhibited article. When it is determined that hand of the walker touches the front glass 204 relative to the sensor 20, it is switched to an image indicating, for example, a price of the article. Such the image control enables any new interactive display to be realized.

Figure 27:
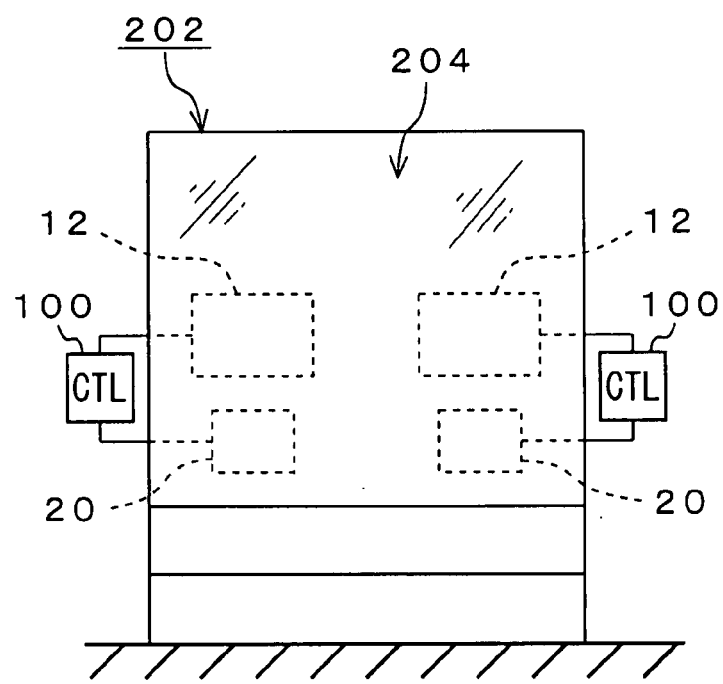
FIG. 27 is a front view of the display window for showing another case.

Even if the information display apparatus 1 with proximity detection performance is applied to the shop window 202, it is possible for the walker to approach to the shop window 202 from either right or left of the building 200. In this case, if the shop window 202 has a large exhibition space, two information display apparatuses 1, 1 may be respectively positioned at positions of the front glass 204 of the shop window 202 near the right and left ends of the front glass 204, as shown in FIG. 27.

Figure 28:
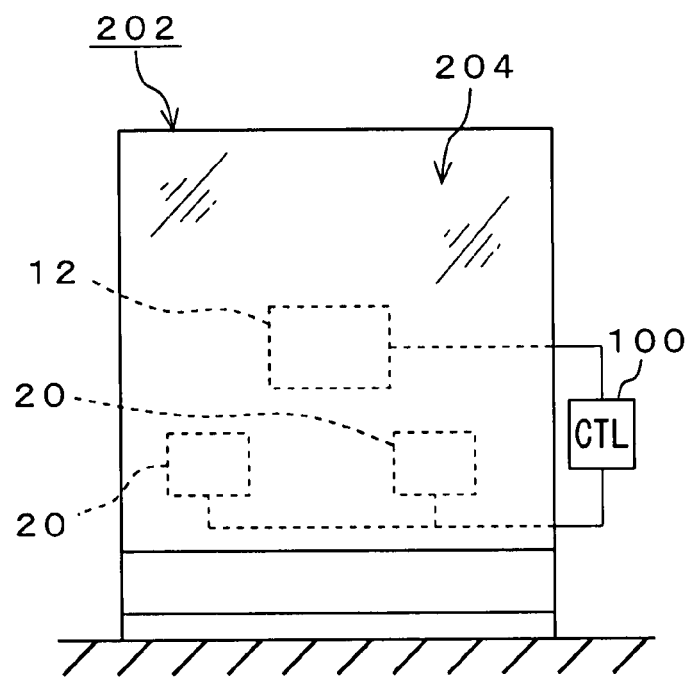
FIG. 28 is a front view of the display window for showing further case.

This allows a walker who approaches to the shop window 202 from any of right and left of the building 200 to be surely and rapidly detected. This also allows plural walkers who approach to the shop window 202 from both right and left of the building 200 to be detected. FIG. 28 shows a variation of the case shown in FIG. 27. In the variation, two sensors 20, 20 are positioned at right and left positions of the front glass 204 and a common display element 12 is positioned at a position of the front glass 204 over the sensors 20, 20.

Figure 29:
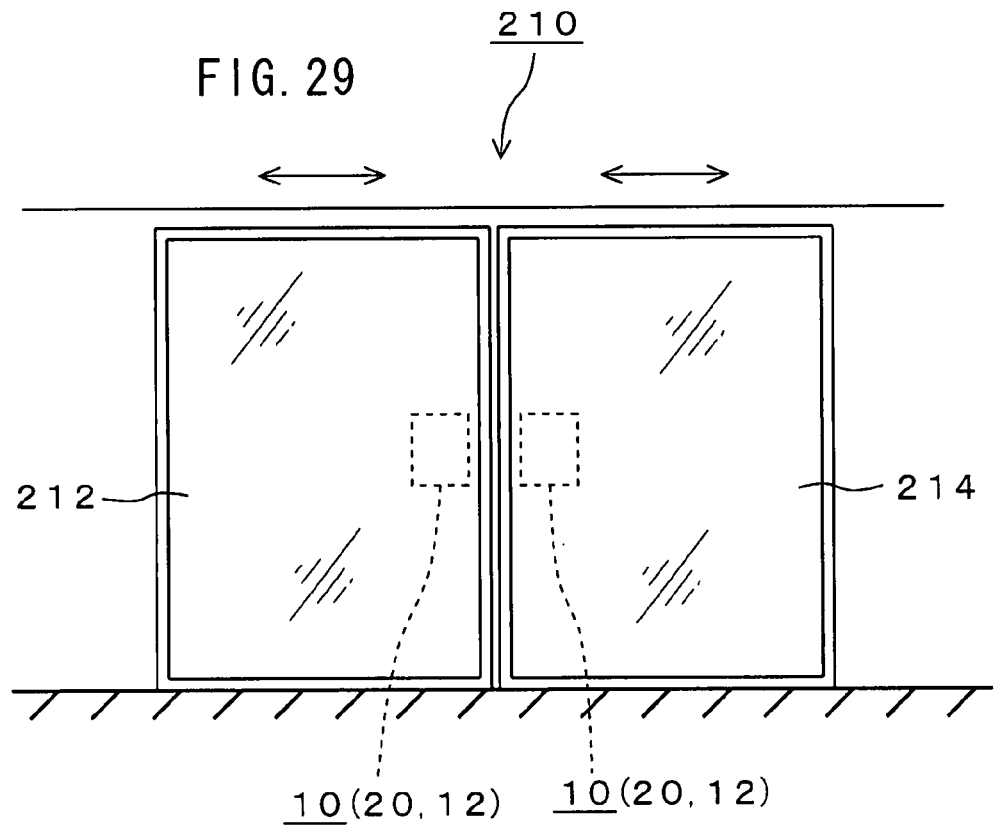
FIG. 29 is a conceptual diagram for showing a case where the above-mentioned another embodiment of the information display apparatus in which the point electrodes are used is attached to an automatic door.

FIG. 29 shows a case where an embodiment of the information display apparatus 1 with proximity detection performance according to the invention is applied to an automatic door 210 using transparent glass. Any touch sensors have been widely used in the automatic doors so that if a user touches the touch sensor installed in the automatic door by his or her hand, the door opens. The door, however, is not opened unless the user touches the touch sensor by his or her hand. It is conceivable that any person might enter into a building in spite of the fact that there is glass because of transparent glass.

By taking it into consideration, the automatic door 210 shown in FIG. 29 uses the above-mentioned information display apparatus 1 in place of the touch sensor. The information display apparatuses 1, 1 are positioned at positions of right and left doors 212, 214 near their ends contacting each other. The information display apparatus 1 in which the display element 12 is integral with the sensor 20 is used.

It, however, is preferred in design that the display element 12 is constituted of transparent member such as an organic EL display element. As the detection electrodes used in the sensor 20, the wired electrodes or the point electrodes may be used. Since it is preferred that the first detection space is of 30 through 40 cm from a surface of the door, the electrodes are so arranged as to be suitable therefor. A size of the information display apparatus 1 is slightly larger than that of the sensor.

The information display apparatus 1 acts as a sensor device together with any warning display. When it is determined that a user approaches to the first detection space S1, the display element 12 first displays presence of the glass of the automatic door 210 as warning representation and an advice for touching the sensor 20. Any sound may be used together it.

When it is determined that the user approaches to the second detection space S2, the display element 12 displays only an advice for touching the sensor 20. Any sound may be used together it.

When it is determined that the user touches the sensor 20, which is the third detection space S3, an announcement that the door will open with the display being kept as it is and to a driving control unit in the automatic door, any instruction to open the door is supplied. In this moment, the door opens. This enables automatic opening of the door to be realized without any danger.

The embodiments of the information display apparatus with proximity detection performance according to the invention are applicable to a display device for interface display screen used in various kinds of vending machines or a gasoline service station, a display device for control panel installed in any transportation such as a vehicle and an airplane, a display device for touch panel used for presentation of the article exhibited in a shop window, a display device for an automatic door, and a display device for a personal computer or a game machine.

It should be understood by those skilled in the art that various modifications, combinations, sub-combinations and alterations may occur depending on design requirements and other factors insofar as they are within the scope of the appended claims or the equivalents thereof.

What is claimed is:

1. An information display apparatus with proximity detection performance, the device comprising:
   a display device that displays image information;
   a sensor constituted of plural detection electrodes; and
   a detection resolution adjusting device that adjusts (a) detection sensitivity of the detection electrodes by controlling an output of each of the detection electrodes and (b) detection resolution by controlling a detection interval determined by a number of electrodes that contribute to the detection electrodes through activation or non-activation of the detection electrodes, the adjustment based on a distance between the sensor and an object to be contacted to any one of the detection electrodes, wherein the detection sensitivity decreases as the object approaches the sensor and the detection resolution increases as the object approaches the sensor to make the detection interval narrower in accordance with the adjustment, and wherein if no object is detected, the detection sensitivity is increased to a maximum and the detection resolution decreases to make the detection interval a maximum in accordance with the adjustment.

2. The information display apparatus according to claim 1, wherein the sensor is provided on a surface of the display device.

3. The information display apparatus according to claim 1, wherein the display device is made of transparent member through which a back side is seen when the display device is not displayed with the display device being isolated from the sensor.

4. The information display apparatus according to claim 1, wherein the sensor contains a panel sensor of capacitance detection type; and
   wherein the detection electrodes include a transparent wired electrode for vertical axis and a transparent wired electrode for horizontal axis, the wired electrodes being extended in matrix on a two-dimensional plane.

5. The information display apparatus according to claim 1, wherein the sensor contains a panel sensor of capacitance detection type; and
   wherein the detection electrodes include a plurality of point electrodes that are arranged in matrix.

6. The information display apparatus according to claim 5, wherein each of the point electrodes contains a coil and a capacitor, which are connected to each other in parallel, and an oscillator that is arranged near the coil and the capacitor.

7. The information display apparatus according to claim 1, wherein the detection resolution adjusting device adjusts the detection resolution by adjusting the detection interval by the detection electrodes that is used for the detection, based on the distance between the sensor and the object.

8. The information display apparatus according to claim 1, wherein the detection electrodes have a detection interval adjusted by thinning out a number of electrodes that contribute to the detection electrodes.

9. An information display apparatus with proximity detection performance, the device comprising:
   a display device that displays image information;
   a sensor constituted of detection electrodes, the sensor being provided on a surface of the display device; and
   a detection resolution adjusting device that adjusts (a) detection sensitivity of the detection electrodes by controlling an output of each of the detection electrodes and (b) detection resolution by controlling a detection interval determined by a number of electrodes that contribute to the detection electrodes through activation or non-activation of the detection electrodes, the adjustment based on a distance between the sensor and an object that is to be contacted to any one of the detection electrodes,
   wherein image information displayed on the display device is controlled in its size, motion, and rotation direction based on a movement of the object and the distance between the sensor and the object, wherein the detection sensitivity decreases as the object approaches the sensor and the detection resolution increases as the object approaches the sensor to make the detection interval narrower in accordance with the adjustment, and wherein if no object is detected, the detection sensitivity is increased to a maximum and the detection resolution decreases to make the detection interval a maximum in accordance with the adjustment.

10. An information display apparatus with proximity detection performance, the device comprising:
   a display device that displays image information;
   a sensor of capacitance type that is constituted of plural detection electrodes, the sensor being provided on a surface of the display device;
   a control device that controls output of each of the detection electrodes and that determines a distance between an object and each detection electrode; and
   an administration device that administrates activation or non-activation of each of the detection electrodes,
   wherein if the sensor of capacitance type detects no object, the control device controls the output of each of the detection electrodes to increase the output to their maximum and the administration device performs processing to make a detection interval, determined by the number of electrodes that contribute to the detection electrodes, to be maximum; and
   wherein if the sensor of capacitance type detects the object, the control device controls the output of each of the detection electrodes to decrease the output based on the distance between the detected object and each of the detection electrodes and the administration device performs processing to make the detection interval by the detection electrodes narrower.

11. An information display method of displaying information, the method comprising the steps of:
   detecting a distance between a sensor and an object by a sensor relative to a display device;
   adjusting (a) detection sensitivity of detection electrodes by controlling an output of each of the detection electrodes and (b) detection resolution of the sensor by controlling a detection interval determined by a number of electrodes that contribute to the detection electrodes through activation or non-activation of the detection electrodes, the adjustment based on the distance between the sensor and the object, wherein the detection sensitivity decreases as the object approaches the sensor and the detection resolution increases as the object approaches the sensor to make the detection interval narrower in accordance with the adjusting, and wherein if no object is detected, the detection sensitivity is increased to a maximum and the detection resolution decreases to make the detection interval a maximum in accordance with the adjusting; and
   controlling display state of the image information displayed on the display device in its size, motion, and rotation direction based on a motion of the object and the distance between the sensor and the object.

* * * * *